United States Patent
Ouchi et al.

(10) Patent No.: US 10,005,024 B2
(45) Date of Patent: Jun. 26, 2018

(54) ACIDIC-GAS SEPARATION MODULE

(71) Applicant: FUJIFILM Corporation, Tokyo (JP)

(72) Inventors: Ryo Ouchi, Ashigara-kami-gun (JP); Makoto Sawada, Ashigara-kami-gun (JP); Daisuke Hiraki, Ashigara-kami-gun (JP); Takeshi Narita, Ashigara-kami-gun (JP); Kenichi Ishizuka, Ashigara-kami-gun (JP)

(73) Assignee: FUJIFILM Corporation, Tokyo (JP)

( * ) Notice: Subject to any disclaimer, the term of this patent is extended or adjusted under 35 U.S.C. 154(b) by 70 days.

(21) Appl. No.: 15/015,726

(22) Filed: Feb. 4, 2016

(65) Prior Publication Data

US 2016/0151740 A1    Jun. 2, 2016

Related U.S. Application Data

(63) Continuation of application No. PCT/JP2014/071547, filed on Aug. 18, 2014.

(30) Foreign Application Priority Data

Aug. 19, 2013 (JP) ................................. 2013-169598
Jul. 10, 2014 (JP) ................................. 2014-141973
Aug. 15, 2014 (JP) ................................. 2014-165489

(51) Int. Cl.
  *B01D 53/22* (2006.01)
  *B01D 63/10* (2006.01)
  *B01D 71/02* (2006.01)

(52) U.S. Cl.
  CPC ........... *B01D 53/228* (2013.01); *B01D 63/10* (2013.01); *B01D 71/021* (2013.01);
  (Continued)

(58) Field of Classification Search
  CPC ............ B01D 53/228; B01D 2053/221; B01D 2053/223; B01D 63/10; B01D 2313/143; B01D 2313/146; B01D 2257/504
  See application file for complete search history.

(56) References Cited

U.S. PATENT DOCUMENTS 3,397,790 A    8/1968  Newby et al.
3,417,870 A    12/1968  Bray
(Continued)

FOREIGN PATENT DOCUMENTS

CN    1054379 A    9/1991
JP    49-8629 A    2/1974
(Continued)

OTHER PUBLICATIONS

Chinese Office Action and Chinese Search Report, dated Sep. 27, 2016, for Chinese Application No. 201480044296.5, along with an English machine translation of the Chinese Office Action.

(Continued)

*Primary Examiner* — Jason M Greene
(74) *Attorney, Agent, or Firm* — Birch, Stewart, Kolasch & Birch, LLP

(57) ABSTRACT

In a spiral type acidic-gas separation module which is obtained by winding a laminate including an acidic gas separation layer that includes a facilitated transport film, a permeating gas channel member which includes a channel regulation member regulating an acidic gas channel that is a channel of an acidic gas having permeated through the facilitated transport film allows a difference in high-pressure deformation amount between a region where the channel regulation member is formed and a region other than the region to be set to 100 µm or less. In this manner, an acidic-gas separation module which prevents damage to the (Continued)

facilitated transport film and exhibits a predetermined performance for a long period of time is provided.

11 Claims, 7 Drawing Sheets

(52) U.S. Cl.
CPC .. *B01D 2053/221* (2013.01); *B01D 2257/504* (2013.01); *B01D 2311/13* (2013.01); *B01D 2313/143* (2013.01); *Y02C 10/10* (2013.01)

(56) References Cited

U.S. PATENT DOCUMENTS

| | | | | |
|---|---|---|---|---|
| 5,069,793 | A * | 12/1991 | Kaschemekat | B01D 63/10 210/247 |
| 5,096,584 | A * | 3/1992 | Reddy | B01D 63/10 210/321.74 |
| 5,275,726 | A * | 1/1994 | Feimer | B01D 63/10 210/321.74 |
| 2007/0180989 | A1 * | 8/2007 | Tanihara | B01D 63/10 95/54 |
| 2009/0026130 | A1 | 1/2009 | Chikura et al. | |
| 2011/0036237 | A1 | 2/2011 | Okada et al. | |
| 2013/0160650 | A1 | 6/2013 | Okada et al. | |
| 2014/0137740 | A1 * | 5/2014 | Aburaya | B01D 53/22 96/13 |
| 2015/0217236 | A1 * | 8/2015 | Nishimura | B01D 53/228 96/9 |

FOREIGN PATENT DOCUMENTS

| | | | | |
|---|---|---|---|---|
| JP | 4-215824 | A | 8/1992 | |
| JP | 5-504298 | A | 7/1993 | |
| JP | 4621295 | B2 | 1/2011 | |
| WO | WO 91/11249 | A1 | 8/1991 | |
| WO | WO 2007/102551 | A1 | 9/2007 | |
| WO | WO 2013/018538 | A1 * | 2/2013 | ............ B01D 69/00 |
| WO | WO 2013/018538 | A1 | 2/2013 | |

OTHER PUBLICATIONS

International Search Report for PCT/JP2014/071547 dated Nov. 4, 2014.
Written Opinion of the International Searching Authority for PCT/JP2014/071547 dated Nov. 4, 2014.
Japanese Office Action dated May 24, 2016 in corresponding Japanese Patent Application No. 2014-165489.

* cited by examiner

FIG. 4A
FIG. 4B
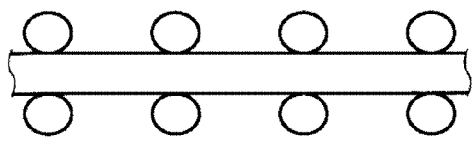
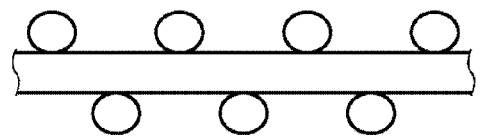
FIG. 5A
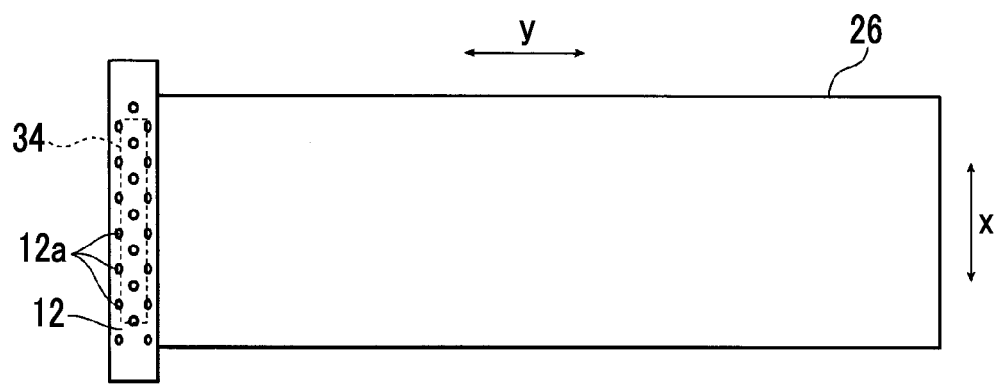
FIG. 5B

ACIDIC-GAS SEPARATION MODULE

CROSS-REFERENCE TO RELATED APPLICATIONS

This application is a Continuation of PCT International Application No. PCT/JP2014/071547 filed on Aug. 18, 2014, which claims priority under 35 U.S.C. § 119(a) to Japanese Patent Application No. 2013-169598 filed on Aug. 19, 2013, Japanese Patent Application No. 2014-141973 filed on Jul. 10, 2014 and Japanese Patent Application No. 2014-165489 filed on Aug. 15, 2014. Each of the above applications is hereby expressly incorporated by reference, in its entirety, into the present application.

BACKGROUND OF THE INVENTION

1. Field of the Invention

The present invention relates to an acidic-gas separation module which selectively separates acidic gas from raw material gas. Specifically, the present invention relates to a spiral-type acidic-gas separation module obtained by winding a laminate including an acidic gas separation film.

2. Description of the Related Art

In recent years, a technique of selectively separating acidic gas such as carbon dioxide from raw material gas (gas to be treated) has been developed. For example, an acidic-gas separation module that separates acidic gas from raw material gas using an acidic gas separation film through which acidic gas selectively permeates has been developed.

For example, JP1992-215824A (JP-H04-215824A) discloses an acidic-gas separation module obtained by winding a laminate containing an acidic gas separation film around a central tube (central permeating material collection tube), in a tube wall of which through-holes are formed and which is used for collecting separated acidic gas, multiple times.

The acidic-gas separation module disclosed in JP1992-215824A (JP-H04-215824A) is a dissolution-diffusion type acidic-gas separation module using a so-called dissolution diffusion film as an acidic gas separation film. The dissolution diffusion film separates acidic gas from raw material gas using differences in solubilities of acidic gas and materials to be separated therefrom in a film and differences in diffusibility in a film.

JP4621295B discloses an acidic-gas separation module (experimental device) that divides a space into a raw material chamber and a permeation chamber using an acidic gas separation film, supplies raw material gas (mixed gas formed of $CO_2$, $H_2$, and $H_2O$) to the raw material chamber, and removes the acidic gas selectively separated out (through permeation) by the acidic gas separation film from the permeation chamber.

The acidic-gas separation module disclosed in JP4621295B is a facilitated transport type acidic-gas separation module using a so-called facilitated transport film as an acidic gas separation film. The facilitated transport film includes a carrier reacting with acidic gas in the film and separates acidic gas from raw material gas by the acidic gas being transported to the opposite side of the film using the carrier.

In such an acidic-gas separation module, with a so-called spiral-type acidic-gas separation module obtained by winding a laminate that includes an acidic gas separation film around a central tube having through-holes on the wall surface (laminate is wrapped around the central tube), as described in JP1992-215824A (JP-H04-215824A), the area of the acidic gas separation film is able to be increased. Accordingly, the spiral-type acidic-gas separation module is capable of performing a treatment with high efficiency.

SUMMARY OF THE INVENTION

The spiral-type acidic-gas separation module includes a supply gas channel member which becomes a raw material gas channel from which acidic gas is separated and a permeating gas channel member which becomes a channel of acidic gas separated out by an acidic gas separation film in addition to an acidic-gas separation film and a central tube, as an example.

The spiral-type acidic-gas separation module including such members has a configuration in which one or a plurality of laminates, each of which is obtained by laminating the acidic gas separation film, the supply gas channel member, and the permeating gas channel member, are wound around the central tube.

For example, JP1992-215824A (JP-H04-215824A) discloses a spiral-type acidic-gas separation module obtained by folding an acidic gas separation film into two and interposing a supply gas channel member (feed material spacer) therebetween, preparing a laminate formed by laminating a permeating gas channel member (permeating material spacer) on one surface of the acidic gas separation films folded into two, and winding a laminated product formed by laminating a plurality of the laminates around a central tube (permeating material collecting tube).

Further, a channel regulation member (sealing (adhesive) edge) which adheres respective laminated sites to each other, regulates a channel of acidic gas having permeated through an acidic gas separation film, and prevents the acidic gas having permeated through the acidic gas separation film from being mixed with raw material gas or the like is formed in the inside of the permeating gas channel member.

Here, raw material gas under the conditions of a high temperature and a high humidity is normally supplied to the acidic-gas separation module using a facilitated transport film at a high pressure. In addition, the acidic-gas separation module using a facilitated transport film is normally operated under a high temperature condition in order to prevent condensation of moisture contained in the raw material gas.

However, according to the examination of the present inventor, when a spiral-type module having a configuration of the above-described acidic-gas separation module using a facilitated transport film is configured, the facilitated transport film deteriorates and is damaged so that the performance of the acidic-gas separation module is gradually degraded in some cases due to the high temperature condition and the pressure of the raw material gas.

The present invention has been made for solving the problems of the related art, and an object thereof is to provide an acidic-gas separation module which is a spiral-type acidic-gas separation module that uses an acidic gas separation layer (separation film) including a facilitated transport film, prevents deterioration of the facilitated transport film caused by the operation condition at a high temperature and the pressure of raw material gas, and stably exhibits a predetermined performance for a long period of time.

In order to achieve the above-described purpose, there is provided an acidic-gas separation module of the invention including a central tube in a tube wall of which through-holes are formed; a supply gas channel member which becomes a channel of raw material gas; an acidic gas separation layer which separates acidic gas from raw material gas flowing in the supply gas channel member and includes a facilitated transport film that contains a carrier reacting with the acidic gas and a hydrophilic compound for carrying the carrier, and a porous support that supports the facilitated transport film; and a permeating gas channel member which is a channel in which the acidic gas having permeated through the acidic gas separation layer flows into the central tube, and is provided with a channel regulation member that regulates an acidic gas channel in the inside and in which a difference in high-pressure deformation amount between a position at which the channel regulation member is formed and a position other than such a position is 100 μm or less, in which at least one laminate including the supply gas channel member, the acidic gas separation layer, and the permeating gas channel member is wound around the central tube.

In the acidic-gas separation module of the present invention, it is preferable that the permeating gas channel member is formed of any one of ceramic, glass, carbon, polyphenylene sulfide, and modified polypropylene.

Further, it is preferable that the thickness of the permeating gas channel member is 600 μm or less.

Further, it is preferable that the permeating gas channel member is woven fabric and fibers extending in the same direction as the direction in which the permeating gas channel member is formed are laminated on each other in a thickness direction.

Further, it is preferable that the laminate includes a pinching body formed by folding the acidic gas separation layer into two and interposing the supply gas channel member between the acidic gas separation layers and has a structure obtained by laminating the permeating gas channel member on the pinching body.

Further, it is preferable that the channel regulation member is formed to have a rectangular shape in which a side of the central tube is open in the plane direction of the permeating gas channel member.

Further, it is preferable that the acidic gas is separated from the raw material gas containing moisture under a temperature condition of 50° C. or higher.

It is preferable that the acidic-gas separation module further includes a hydrophobic intermediate layer having gas permeability between the porous support and the facilitated transport film.

Further, it is preferable that the intermediate layer is a silicone resin layer.

Further, it is preferable that the facilitated transport film contains at least one metal element selected from a group consisting of Ti, Zr, Al, Si, and Zn.

Further, it is preferable that the content of the metal element in the facilitated transport film is in a range of 0.1% by mass to 50% by mass with respect to the total mass of the hydrophilic compound.

Further, it is preferable that the facilitated transport film contains a structural unit represented by Formula (1):

Formula (1)

M represents a metal element selected from the group consisting of Ti, Zr, Al, Si, and Zn. m represents the valence of the metal element represented by M. The symbol "*" represents a binding site.

According to the present invention, the spiral-type acidic-gas separation module that uses a facilitated transport film can suitably prevent deterioration or damage to the facilitated transport film caused by the high temperature condition or the pressure of raw material gas.

For this reason, according to the present invention, it is possible to obtain an acidic-gas separation module stably exhibiting a predetermined performance for a long period of time.

BRIEF DESCRIPTION OF THE DRAWINGS

FIG. 4A is a view schematically illustrating woven fabric suitable for a permeating gas channel member of the acidic-gas separation module of the present invention and FIG. 4B is a view schematically illustrating normal woven fabric.

FIGS. 5A and 5B are conceptual views for describing a method of preparing the acidic-gas separation module illustrated in FIG. 1.

DESCRIPTION OF THE PREFERRED EMBODIMENTS

Hereinafter, an acidic-gas separation module of the present invention will be described in detail with reference to preferred examples illustrated in the accompanying drawings.

Figure 1:
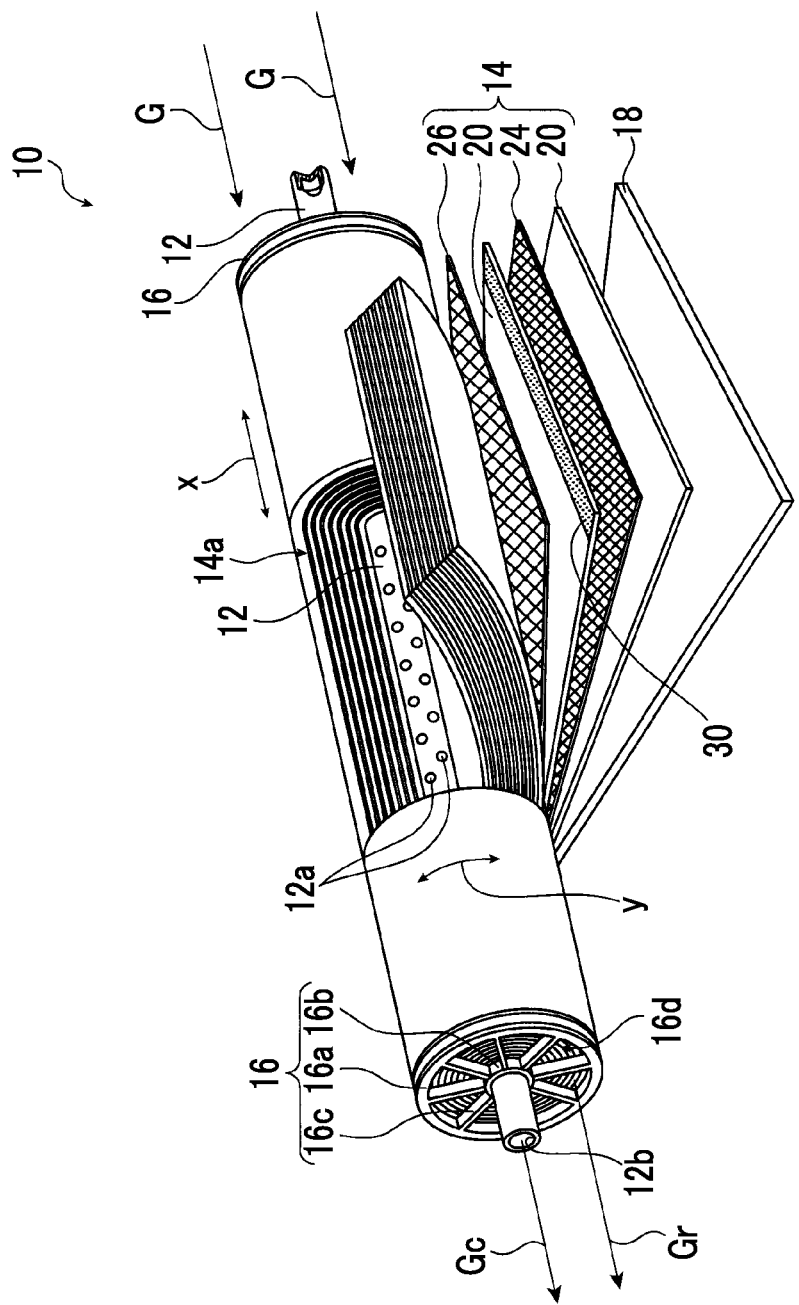
FIG. 1 is a perspective view schematically illustrating an example of an acidic-gas separation module of the present invention by cutting out a part thereof.

FIG. 1 is a perspective view schematically illustrating an example of the acidic-gas separation module of the present invention by cutting out a part thereof.

As illustrated in FIG. 1, an acidic-gas separation module 10 basically includes a central tube 12, a laminate 14 including an acidic gas separation layer 20 (facilitated transport film 20a), and a telescoping prevention plate 16. In addition, the acidic-gas separation module is also simply referred to as a separation module in the description below.

The separation module 10 separates carbon dioxide as acidic gas Gc from raw material gas G containing carbon monoxide, carbon dioxide ($CO_2$), water (water vapor), and hydrogen.

The separation module 10 of the present invention is a so-called spiral-type separation module. That is, the separation module 10 has a configuration in which one or a plurality of sheet-like laminates 14 are laminated on each other and wound around the central tube 12 and telescoping prevention plates 16 are provided on both end surfaces of the wound product of the laminate 14 into which the central tube 12 is inserted. Moreover, the outermost peripheral surface of the laminate 14 wound around the tube is covered by a gas-impermeable coating layer 18.

Further, for the sake of convenience of description, the wound product of a laminated product obtained by laminating a plurality of the laminates 14 which are wound around the central tube 12 is referred to as a laminate wound product 14a in the description below. In other words, the laminate wound product 14a is a substantially cylindrical product formed of the laminates 14 which are laminated on each other and wound around the central tube.

In such a separation module 10, the raw material gas G from which the acidic gas is separated passes through the telescoping prevention plate 16 (opening portion 16d) on the far side in FIG. 1, is supplied to the end surface of the laminate wound product 14a, and flows into the laminate 14 from the end surface, and the acidic gas Gc is separated out while flowing in the laminate 14.

Moreover, the acidic gas Gc separated from the raw material gas G by the laminate 14 is discharged from the central tube 12. In addition, the raw material gas G (hereinafter, for the sake of convenience of description, referred to as residual gas Gr) from which the acidic gas Gc has been separated is discharged from the end surface on the side opposite to the supply side of the laminate wound product 14a (laminate 14), and is discharged outside of the separation module 10 after passing through the telescoping prevention plate 16 (in the same manner as described above).

The central tube (permeating gas collecting tube) 12 is a cylindrical tube, in which the end surface on the supply side of the raw material gas G is blocked, and in which a plurality of through-holes 12a are formed on the peripheral surface (tube wall) thereof.

The acidic gas Gc separated from the raw material gas G reaches the inside of the central tube 12 from the through-holes 12a after passing through a permeating gas channel member 26 described below and is discharged from an open end 12b of the central tube 12.

In the central tube 12, the opening ratio (the area ratio of the through-holes 12a occupying the outer peripheral surface of the central tube 12) in a region sealed by an adhesive layer 30 described below is preferably in a range of 1.5% to 80%, more preferably in a range of 3% to 75%, and still more preferably in a range of 5% to 70%. In this, from the practical viewpoint, the opening ratio of the central tube 12 is particularly preferably in a range of 5% to 25%.

When the opening ratio of the central tube 12 is in the above-described range, the acidic gas Gc can be efficiently collected, the strength of the central tube 12 is higher, and the processing suitability can be secured.

Further, it is preferable that the through-hole 12a is a circular hole having a diameter of 0.5 mm to 20 mm. Further, it is preferable that the through-holes 12a are uniformly formed on the peripheral wall of the central tube 12.

In addition, the central tube 12 may be provided with a supply port (supply unit) that supplies gas (sweep gas) for allowing the separated acidic gas Gc to flow into the open end 12b side as needed.

The laminate 14 is obtained by laminating the acidic gas separation layer 20, the supply gas channel member 24, and the permeation gas channel member 26 on each other.

Further, in FIG. 1, the reference number 30 is an adhesive layer 30 that bonds the acidic gas separation layer 20 to the permeating gas channel member 26, bonds the laminates 14 to each other, and regulates a channel of the acidic gas Gc in the permeating gas channel member 26.

The separation module 10 in the example of the figure has a configuration in which a plurality of the laminates 14 are laminated on each other, are wound around the central tube 12 (the laminates are wrapped around the central tube), and form a substantially cylindrical laminate wound product 14a.

Hereinafter, for the sake of convenience of description, a direction corresponding to the winding of the laminate 14 is set as a winding direction (arrow y direction) and a direction perpendicular to the winding direction is set as a width direction (arrow x direction).

In the separation module 10, one layer of the laminate 14 may be formed. However, as in the example of the figure, when a plurality of the laminates 14 are laminated on each other, the film area of the acidic gas separation layer 20 is increased and the amount of the acidic gas Gc separated out by one module can be increased.

The number of sheets of the laminates 14 to be laminated may be appropriately set according to the treatment rate and the treatment amount required for the separation module 10, the size of the separation module 10, and the like. Here, the number of sheets of the laminates 14 to be laminated is preferably 50 or less, more preferably 45 or less, and particularly preferably 40 or less. When the number of sheets of the laminates 14 to be laminated is in the above-described range, the winding of the laminates 14 around the central tube 12 becomes easy and the workability can be improved.

Figure 2:
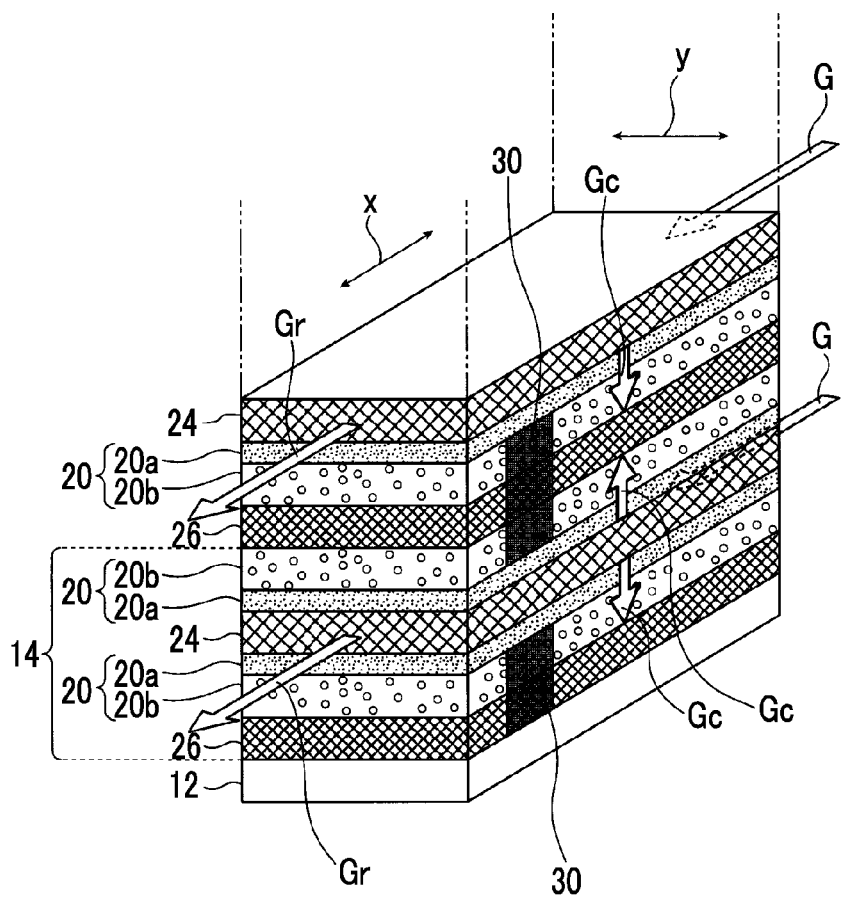
FIG. 2 is a sectional view schematically illustrating a laminate of the acidic-gas separation module illustrated in FIG. 1.

FIG. 2 is a partial sectional view illustrating the laminate 14. As described above, the arrow x indicates the width direction and the arrow y indicates the winding direction.

In the example of the figure, the laminate 14 has a configuration in which the supply gas channel member 24 is interposed between the acidic gas separation layers 20 folded into two to form a pinching body 36 (see FIG. 6) and the permeating gas channel member 26 is laminated on the pinching body 36. The configuration will be described below in detail.

As described above, in the separation module 10, the raw material gas G passes through the telescoping prevention plate 16 (the opening portion 16d) and is supplied from one end surface of the laminate wound product 14a. That is, the raw material gas G is supplied to the end portion (end surface) of each laminate 14 in the width direction.

As conceptually illustrated in FIG. 2, the raw material gas G supplied to the end surface of the laminate 14 in the width direction flows into the supply gas channel member 24 in the width direction (arrow x direction). During the flow, the acidic gas Gc which is brought into contact with the facilitated transport film 20a of the acidic gas separation layer 20 is separated from the raw material gas G, passes through the acidic gas separation layer 20 in the lamination direction of the laminate 14, and flows into the permeating gas channel member 26. Specifically, the acidic gas Gc which is brought into contact with the facilitated transport film 20a is separated from the raw material gas G, transported in the lamination direction by the carrier of the facilitated transport film 20a, and flows into the permeating gas channel member 26.

The acidic gas Gc flowing into the permeating gas channel member 26 flows in the permeating gas channel member 26 in the winding direction (arrow y direction), and reaches the central tube 12. The acidic gas Gc having reached the central tube 12 flows into the central tube 12 from the through-holes 12a of the central tube 12.

The flow of the acidic gas Gc is regulated by the adhesive layer 30. That is, in the separation module 10, an envelope-like channel (space), in which the central tube 12 side is open, incorporating the permeating gas channel member 26 on the inside of the adhesive layer 30 in the plane direction is formed by two acidic gas separation layers 20 (facilitated transport films 20a) between which the permeating gas channel member 26 is interposed and the adhesive layer 30 having infiltrated into the permeating gas channel member 26 and the acidic gas separation layer 20 (porous support 20b) (see FIGS. 6 and 7A). In this manner, the separation module 10 regulates the channel of the acidic gas Gc having permeated into the acidic gas separation layer 20 in a direction facing the central tube 12 and prevents the acidic gas Gc having permeated into the acidic gas separation layer 20 from being mixed with the raw material gas G or residual gas Gr. The adhesive layer 30 will be described below in detail.

In the separation module 10 of the present invention, a difference in high-pressure deformation amount between a position at which the adhesive layer 30 is formed and a position other than such a position in the permeating gas channel member 26 is 100 μm or less. This point will be also described below.

The acidic gas Gc flowing into the central tube 12 flows in the central tube 12 in the width direction and is discharged from the open end 12b.

The residual gas Gr from which the acidic gas Gc has been removed flows into the supply gas channel member 24 in the width direction, is discharged from the end surface on the opposite side of the laminate wound product 14a, passes through the telescoping prevention plate 16 (the opening portion 16d), and is discharged outside of the separation module 10.

The supply gas channel member 24 supplies the raw material gas G from the end portion in the width direction thereof and brings the raw material gas G flowing in the member into contact with the acidic gas separation layer 20.

Such a supply gas channel member 24 functions as a spacer of the acidic gas separation layers 20 folded into two as described above and constitutes a channel of the raw material gas G. Further, it is preferable that the supply gas channel member 24 causes turbulence in the raw material gas G. In consideration of this point, the supply gas channel member 24 has a network structure (network-like/mesh-like).

As materials for forming such a supply gas channel member 24, various materials can be used as long as the materials have sufficient heat resistance and moisture resistance.

Preferred examples thereof include paper materials such as paper, high-quality paper, coated paper, cast-coated paper, and synthetic paper; resin materials such as cellulose, polyester, polyolefin, polyamide, polyimide, polysulfone, aramid, and polycarbonate; and inorganic materials such as metals, glass, and ceramics.

Specific examples of the resin materials include polyethylene, polystyrene, polyethylene terephthalate (PET), polytetrafluoroethylene (PTFE), polyethersulfone (PES), polyphenylene sulfide (PPS), polysulfone (PSF), polypropylene (PP), polyimide, polyetherimide, polyether ether ketone, and polyvinylidene fluoride. Such resin materials may be used in combination of plural kinds thereof.

The thickness of the supply gas channel member 24 may be appropriately determined according to the amount of the raw material gas G to be supplied or treatment performance to be required.

Specifically, the thickness thereof is preferably in a range of 100 μm to 1000 μm, more preferably in a range of 150 μm to 950 μm, and particularly preferably in a range of 200 μm to 900 μm.

The separation module 10 of the present invention is a facilitated transport type module. Accordingly, the acidic gas separation layer 20 is configured of the facilitated transport film 20a and the porous support 20b.

The facilitated transport film 20a includes at least a carrier reacting with the acidic gas Gc contained in the raw material gas G that flows in the supply gas channel member 24 and a hydrophilic compound carrying the carrier. Such a facilitated transport film 20a has a function of allowing the acidic gas Gc to selectively permeate from the raw material gas G (function of selectively transporting the acidic gas Gc).

A property of the facilitated transport type separation module which is required is that the module can be used in a high temperature and high humidity environment. Accordingly, the facilitated transport film 20a has a function of allowing the acidic gas Gc to selectively permeate in a high temperature condition (for example, in a temperature range of 50° C. to 200° C.). Further, when a hydrophilic compound absorbs water vapor so that the facilitated transport film 20a holds moisture even if the raw material gas G contains water vapor, since a carrier more easily transports the acidic gas Gc, the separation efficiency becomes higher than in a case of using a dissolution diffusion film.

The film area of the facilitated transport film 20a may be appropriately set according to the size of the separation module 10, the treatment performance required for the separation module 10, and the like. Specifically, the film area is preferably in a range of 0.01 $m^2$ to 1000 $m^2$, more preferably in a range of 0.02 $m^2$ to 750 $m^2$, and still more preferably in a range of 0.025 $m^2$ to 500 $m^2$. In this, from the practical viewpoint, the film area of the facilitated transport film 20a is particularly preferably in a range of 1 $m^2$ to 100 $m^2$.

When the film area of the facilitated transport film 20a is in the above-described range, the acidic gas Gc can be efficiently separated out with respect to the film area and the workability becomes improved.

The length of the facilitated transport film 20a (total length before folding into two) in the winding direction may be appropriately set according to the size of the separation module 10, the treatment performance required for the separation module 10, and the like. Specifically, the length thereof is preferably in a range of 100 mm to 10,000 mm, more preferably in a range of 150 mm to 9000 mm, and still more preferably in a range of 200 mm to 8000 mm. In this, from the practical viewpoint, the length of the facilitated transport film 20a is particularly preferably in a range of 800 mm to 4000 mm.

When the length of the facilitated transport film 20a in the winding direction is in the above-described range, the acidic gas Gc can be efficiently separated out with respect to the film area. Further, when the length of the facilitated transport film 20a in the winding direction is in the above-described range, generation of winding deviation at the time of winding the laminate 14 is suppressed, and the workability is improved.

Further, the width of the facilitated transport film may be appropriately set according to the size of the separation module 10 in the width direction.

The thickness of the facilitated transport film 20a may be appropriately set according to the size of the separation module 10, the treatment performance required for the separation module 10, and the like. Specifically, the thickness thereof is preferably in a range of 1 μm to 200 μm and more preferably in a range of 2 μm to 175 μm.

High gas permeability and separation selectivity can be realized by adjusting the thickness of the facilitated transport film 20a to be in the above-described range.

A hydrophilic compound functions as a binder, holds moisture in the facilitated transport film 20a, and exhibits a function of separating out gas such as carbon dioxide using a carrier. Moreover, it is preferable that the hydrophilic compound has a cross-linked structure from a viewpoint of heat resistance.

As such a hydrophilic compound, a hydrophilic polymer is exemplified.

A hydrophilic compound having high hydrophilicity is preferable from viewpoints that the hydrophilic compound is dissolved in water and capable of forming a coating solution and it is preferable that the facilitated transport film 20a has high hydrophilicity (moisture-retaining properties).

Specifically, the hydrophilic compound has a hydrophilicity at which the water absorption amount of physiological saline is preferably 0.5 g/g or greater, more preferably 1 g/g or greater, still more preferably 5 g/g or greater, particularly preferably 10 g/g or greater, and most preferably 20 g/g or greater.

The weight average molecular weight of the hydrophilic compound may be appropriately selected within the range in which a stable film can be formed. Specifically, the weight average molecular weight thereof is preferably 20,000 to 2,000,000, more preferably 25,000 to 2,000,000, and particularly preferably 30,000 to 2,000,000.

By adjusting the weight average molecular weight of the hydrophilic compound to be 20,000 or greater, the facilitated transport film 20a which is stabilized and has sufficient film strength can be obtained.

Particularly, in a case where the hydrophilic compound includes a hydroxy group (—OH) as a crosslinkable group, the weight average molecular weight of the hydrophilic compound is preferably 30,000 or greater. At this time, the weight average molecular weight thereof is more preferably 40,000 or greater and still more preferably 50,000 or greater. Further, in the case where the hydrophilic compound includes a hydroxy group as a crosslinkable group, the weight average molecular weight thereof is preferably 6,000,000 or less from a viewpoint of production suitability.

In addition, in a case where the hydrophilic compound includes an amino group (—$NH_2$) as a crosslinkable group, the weight average molecular weight of the hydrophilic compound is preferably 10,000 or greater. At this time, the weight average molecular weight of the hydrophilic compound is more preferably 15,000 or greater and particularly preferably 20,000 or greater. Further, in the case where the hydrophilic compound includes an amino group as a crosslinkable group, the weight average molecular weight thereof is preferably 1,000,000 or less from a viewpoint of production suitability.

Further, a value measured in comformity with JIS K6726 may be used as the weight average molecular weight of the hydrophilic compound in a case where PVA is used as the hydrophilic compound. In addition, when a commercially available product is used, the molecular weight known by a catalog or a specification may be used.

As a crosslinkable group that forms a hydrophilic compound, one which can form a hydrolysis-resistant cross-linked structure is preferably selected.

Specific examples thereof include a hydroxy group (—OH), an amino group (—$NH_2$), a chlorine atom (—Cl), a cyano group (—CN), a carboxy group (—COOH), and an epoxy group. Among these, an amino group and a hydroxy group are preferable. Further, from viewpoints of affinity for a carrier and an effect of carrying a carrier, a hydroxy group is most preferable.

Specific examples of the hydrophilic compound which has a single crosslinkable group include polyallylamine, polyacrylic acid, polyvinyl alcohol, polyvinyl pyrrolidone, polyacrylamide, polyethyleneimine, polyvinylamine, polyornithine, polylysine, polyethylene oxide, water-soluble cellulose, starch, alginic acid, chitin, polysulfonic acid, polyhydroxy methacrylate, and poly-N-vinylacetamide. Polyvinyl alcohol is most preferable. In addition, as the hydrophilic compound, a copolymer of these may be exemplified.

Further, examples of the hydrophilic compound having a plurality of crosslinkable groups include a polyvinyl alcohol-polyacrylic acid copolymer. A polyvinyl alcohol-polyacrylic salt copolymer has high water absorption performance and high hydrogel strength at the time of high water absorption, which is preferable.

The percentage content of polyacrylic acid in the polyvinyl alcohol-polyacrylic acid copolymer is in a range of 1% by mole to 95% by mole, preferably in a range of 2% by mole to 70% by mole, still more preferably in a range of 3% by mole to 60% by mole, and particularly preferably in a range of 5% by mole to 50% by mole.

In addition, in the polyvinyl alcohol-polyacrylic acid copolymer, there may be a salt of polyacrylic acid. As the polyacrylate at this time, an ammonium salt or an organic ammonium salt may be exemplified in addition to an alkali metal salt such as a sodium salt or a potassium salt.

The polyvinyl alcohol may be a commercially available product. Specific examples thereof include PVA117 (manufactured by KURARAY CO., LTD.), POVAL (manufactured by KURARAY CO., LTD.), polyvinyl alcohol (manufactured by Sigma-Aldrich Japan K.K.), and J-POVAL (manufactured by JAPAN VAM&POVAL CO., LTD.). The range of the molecular weight varies, but a product having a weight average molecular weight of 130,000 to 300,000 is preferable.

The polyvinyl alcohol-polyacrylate copolymer (sodium salt) may be a commercially available product. For example, KURASTOMER AP20 (manufactured by KURARAY CO., LTD.) is exemplified.

Moreover, in the facilitated transport film 20a of the separation module 10 of the present invention, hydrophilic compounds may be used in a mixture of two or more kinds thereof.

The content of the hydrophilic compound in the facilitated transport film 20a may be determined by appropriately setting the amount thereof which can function as a binder in order to form the facilitated transport film 20a and can sufficiently hold moisture according to the kind of hydrophilic composition or carrier.

Specifically, the content thereof is preferably in a range of 0.5% by mass to 50% by mass, more preferably in a range of 0.75% by mass to 30% by mass, and particularly preferably in a range of 1% by mass to 15% by mass. When the content of the hydrophilic compound in the facilitated transport film 20a is in the above-described range, the function as a binder and the function of holding moisture described above can be stably and suitably exhibited.

The cross-linked structure of the hydrophilic compound can be formed using a known method of the related art, for example, thermal crosslinking, ultraviolet crosslinking, electron beam crosslinking, radiation crosslinking, or photocrosslinking.

Photocrosslinking or thermal crosslinking is preferable and thermal crosslinking is most preferable.

Further, it is preferable to use a crosslinking agent together with a hydrophilic compound in order to form the facilitated transport film 20a. That is, it is preferable to use a coating composition containing a crosslinking agent when the facilitated transport film 20a is formed by a coating method.

As the crosslinking agent, a crosslinking agent including two or more functional groups which react with a hydrophilic compound and are capable of performing crosslinking such as thermal crosslinking or photocrosslinking is selected. Further, it is preferable that the cross-linked structure to be formed is a hydrolysis-resistant cross-linked structure.

From this viewpoint, preferred examples of the crosslinking agent to be used for forming the facilitated transport film 20a include an epoxy crosslinking agent, a polyvalent glycidyl ether, a polyhydric alcohol, a polyvalent isocyanate, a polyvalent aziridine, a haloepoxy compound, a polyvalent aldehyde, a polyvalent amine, and an organic metal-based crosslinking agent. A polyvalent aldehyde, an organic metal-based crosslinking agent, and an epoxy crosslinking agent are more preferable. Among these, a polyvalent aldehyde such as glutaraldehyde or formaldehyde having two or more aldehyde groups is preferable.

As the epoxy crosslinking agent, a compound including two or more epoxy groups may be exemplified and a compound including four or more epoxy groups is preferable. The epoxy crosslinking agent is also commercially available and examples thereof include trimethylolpropane triglycidyl ether (EPOLIGHT 100MF or the like, manufactured by KYOEISHA CHEMICAL Co., LTD.), EX-411, EX-313, EX-614B, EX-810, EX-811, EX-821, EX-830, (all manufactured by Nagase Chemtex Corporation), and EPIOL E400 (manufactured by NOF CORPORATION).

In addition, as a compound similar to an epoxy crosslinking agent, an oxetane compound having a cyclic ether is preferably used. A polyvalent glycidyl ether having two or more functional groups is preferable as an oxetane compound. A commercially available product can be used for an oxetane compound. Examples of commercially available products include EX-411, EX313, EX-614B, EX-810, EX-811, EX-821, and EX-830 (all manufactured by Nagase Chemtex Corporation).

Examples of the polyvalent glycidyl ether include ethylene glycol diglycidyl ether, polyethylene glycol diglycidyl ether, glycerol polyglycidyl ether, diglycerol polyglycidyl ether, polyglycerol polyglycidyl ether, sorbitol polyglycidyl ether, pentaerythritol polyglycidyl ether, propylene glycol glycidyl ether, and polypropylene glycol diglycidyl ether.

Examples of the polyhydric alcohol include ethylene glycol, diethylene glycol, triethylene glycol, tetraethylene glycol, polyethylene glycol, glycerin, polyglycerin, propylene glycol, diethanolamine, triethanolamine, polyoxypropyl, an oxyethylene-oxypropylene block copolymer, pentaerythritol, and sorbitol.

Examples of the polyvalent isocyanate include 2,4-toluylene diisocyanate and hexamethylene diisocyanate.

Examples of the polyvalent aziridine include 2,2-bishydroxymethylbutanol-tris[3-(1-aziridinyl)propionate], 1,6-hexamethylene diethylene urea, and diphenylmethane-bis-4,4'-N,N'-diethylene urea.

Examples of the haloepoxy compound include epichlorohydrin and α-methylchlorohydrin.

Examples of the polyvalent aldehyde include glutaraldehyde and glyoxal.

Examples of the polyvalent amine include ethylenediamine, diethylenetriamine, triethylenetetramine, tetraethylenepentamine, pentaethylenehexamine, and polyethyleneimine.

Further, examples of the organic metal-based crosslinking agent include an organic titanium crosslinking agent and an organic zirconia crosslinking agent.

For example, in a case where a polyvinyl alcohol having a weight average molecular weight of 130,000 or greater is used as a hydrophilic compound, an epoxy crosslinking agent or glutaraldehyde is preferably used in terms of excellent reactivity with the hydrophilic compound and capability of forming a cross-linked structure having excellent hydrolysis resistance.

In addition, in a case where a polyvinyl alcohol-polyacrylic acid copolymer is used as a hydrophilic compound, an epoxy crosslinking agent or glutaraldehyde is preferably used.

In addition, in a case where a polyallylamine having a weight average molecular weight of 10,000 or greater is used as a hydrophilic compound, an epoxy crosslinking agent, glutaraldehyde, or an organic metal crosslinking agent is preferably used in terms of excellent reactivity with the hydrophilic compound and capability of forming a cross-linked structure having excellent hydrolysis resistance.

In addition, in a case where a polyethyleneimine or polyallylamine is used as a hydrophilic compound, an epoxy crosslinking agent is preferably used.

The amount of a crosslinking agent may be appropriately set according to the kind of hydrophilic compound or crosslinking agent used for forming the facilitated transport film 20a.

Specifically, the amount thereof is preferably in a range of 0.001 parts by mass to 80 parts by mass, more preferably 0.01 parts by mass to 60 parts by mass, and particularly preferably 0.1 parts by mass to 50 parts by mass with respect to 100 parts by mass of a crosslinkable group included in the hydrophilic compound. When the content of the crosslinking agent is adjusted to be in the above-described range, the formation properties of the cross-linked structure become excellent and a facilitated transport film with excellent shape-maintaining properties can be obtained.

In addition, when the crosslinkable group included in the hydrophilic compound is considered, it is preferable that the cross-linked structure is formed by reacting 0.001 mol to 80 mol of a crosslinking agent with 100 mol of the crosslinkable group included in the hydrophilic compound.

It is preferable that the facilitated transport film 20a contains metal elements. As a preferable embodiment of the facilitated transport film 20a, an embodiment in which the facilitated transport film contains at least one metal element selected from a group consisting of Ti, Zr, Al, Si, and Zn is exemplified. When such a metal element is contained, the strength of the facilitated transport film 20a is improved. Particularly, when a crosslinking structure having the above-described metal elements is formed as described below, the strength of the facilitated transport film 20a is further improved and thus deterioration of the facilitated transport film 20a at the time of winding in the form of a spiral is more suppressed.

The form of the facilitated transport film 20a containing such a metal element is not particularly limited, but a facilitated transport film having a structural unit represented by the following Formula (1) is preferable. Further, the symbol "*" in the following Formula (1) represents a binding position.

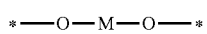

Formula (1)

In the formula, M represents a metal element selected from the group consisting of titanium (Ti), zirconium (Zr), aluminum (Al), silicon (Si), and zinc (Zn).

m represents the valence of the metal element represented by M. For example, as described below, m represents 2 when M represents Zn, m represents 3 when M represents Al, and m represents 4 when M represents Ti, Zr, and Si.

More specifically, structural formulae (Formulae (2) to (4)) are shown below in the case where m represents 2 to 4.

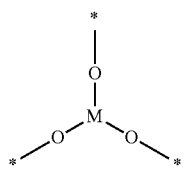

Formula (2)

Formula (3)

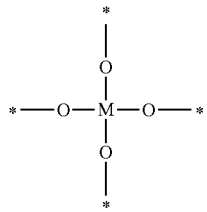

Formula (4)

The structural unit represented by Formula (1) can be introduced to the facilitated transport film 20a by combining a hydrolyzable compound with a hydrophilic compound having the above-described crosslinkable group (for example, a hydroxy group) as described below. In this case, the structural unit functions as a so-called crosslinking moiety (crosslinking structure).

Further, as a method of detecting the structural unit represented by Formula (1) in the facilitated transport film 20a, the structural unit thereof can be verified by detecting specific peaks through IR measurement. The IR measurement may be performed on remaining films after carriers in the facilitated transport film 20a are removed if necessary.

The total mass of the metal elements in the facilitated transport film 20a is not particularly limited, but the content of the metal elements is preferably in a range of 0.1% by mass to 50% by mass, more preferably in a range of 0.3% by mass to 20% by mass, and still more preferably in a range of 0.5% by mass to 10% by mass with respect to the total mass of the hydrophilic compound in terms that the facilitated transport film 20a has superior strength.

The method of measuring the content of metal elements is not particularly limited and the content thereof can be measured by fluorescent X-ray spectroscopy.

As described above, when the structural unit represented by Formula (1) is introduced to the facilitated transport film 20a, it is preferable that a hydrolyzable compound containing the above-described metal elements is used, and specific example thereof include a hydrolyzable compound represented by Formula (5) is exemplified. These compounds function as a so-called organic metal crosslinking agent.

$M(X)_m$

Formula (5)

In Formula (5), M represents a metal element selected from the group consisting of titanium (Ti), zirconium (Zr), aluminum (Al), silicon (Si), and zinc (Zn).

X represents a hydrolyzable group. Examples of the hydrolyzable group include an alkoxyl group, an isocyanate group, a halogen atom such as a chlorine atom, an oxyhalogen group, an acetylacetonate group, and a hydroxy group. A plurality of X's may be the same as or different from each other.

m represents the valence of the metal element represented by M.

As described above, in the acidic gas separation layer 20 of the separation module 10, the facilitated transport film 20a contains a carrier in addition to such a hydrophilic compound.

The carrier may be various kinds of water-soluble compound which have affinity for acidic gas (for example, carbon dioxide) and show basicity. Specific examples thereof include an alkali metal compound, a nitrogen-containing compound, and a sulfur compound.

In addition, a carrier may indirectly react with acidic gas or the carrier itself may directly react with acidic gas.

Examples of the former include carriers which react with another gas contained in a supply gas and show basicity and in which a basic compound thereof reacts with acidic gas. More specifically, the former is a compound which is capable of selectively taking $CO_2$ into the facilitated transport film 20a, for example, an alkali metal compound by reacting with steam (moisture) to release OH— and allowing OH— to react with $CO_2$.

Examples of the latter include a nitrogen-containing compound and a sulfur compound in which a carrier has basicity.

Examples of the alkali metal compound include alkali metal carbonates, alkali metal bicarbonates, and an alkali metal hydroxides. Here, an alkali metal element selected from cesium, rubidium, potassium, lithium, and sodium is preferably used as an alkali metal. In addition, in the present invention, the alkali metal compound includes salts and ions thereof in addition to an alkali metal.

Examples of the alkali metal carbonate include lithium carbonate, sodium carbonate, potassium carbonate, rubidium carbonate, and cesium carbonate.

Examples of the alkali metal bicarbonate include lithium hydrogencarbonate, sodium hydrogencarbonate, potassium hydrogencarbonate, rubidium hydrogencarbonate, and cesium hydrogencarbonate.

Further, examples of the alkali metal hydroxide include lithium hydroxide, sodium hydroxide, potassium hydroxide, rubidium hydroxide, and cesium hydroxide.

Among these, an alkali metal carbonate is preferable, and a compound containing potassium, rubidium, and cesium which have high solubility in water are preferable from a viewpoint of excellent affinity for acidic gas.

Moreover, when an alkali metal compound is used as a carrier, two or more kinds of carrier may be used in combination.

When two or more kinds of carrier are present in the facilitated transport film 20a, different kinds of carriers in the film can be separated from each other. In this manner, adhesion (blocking) of the facilitated transport films 20a to each other or adhesion of the facilitated transport film 20a to another member, caused by hygroscopicity of the facilitated transport film 20a, can be suitably suppressed at the time of production or the like due to a difference in deliquescency among a plurality of carriers.

In addition, in a case where two or more kinds of alkali metal compound are used as carriers, it is preferable that a first compound having deliquescency and a second compound having less deliquescency and a smaller specific specific gravity than those of the first compound are included. When a carrier includes a first compound having deliquescency and a second compound having less deliquescency and a smaller specific specific gravity than those of the first compound, the effect of suppressing blocking can be more suitably obtained. As an example, cesium carbonate is exemplified as the first compound and potassium carbonate is exemplified as the second compound.

As the nitrogen-containing compounds, amino acids such as glycine, alanine, serine, proline, histidine, taurine, and diaminopropionic acid; hetero compounds such as pyridine, histidine, piperazine, imidazole, and triazine; alkanolamines such as monoethanolamine, diethanolamine, triethanolamine, monopropanolamine, dipropanolamine, and tripropanolamine; cyclic polyether amines such as cryptand [2.1] and cryptand[2.2]; bicyclic polyether amines such as cryptand[2.2.1] and cryptand[2.2.2]; porphyrin; phthalocyanine; and ethylenediaminetetraacetic acid can be used.

As sulfur compounds, amino acids such as cystine and cysteine; polythiophene; and dodecylthiol can be used.

The content of carriers in the facilitated transport film 20a may be suitably set according to the kind of carrier and hydrophilic compound. Specifically, the content thereof is preferably in a range of 0.3% by mass to 30% by mass, more preferably in a range of 0.5% by mass to 25% by mass, and particularly preferably in a range of 1% by mass to 20% by mass.

When the content of the carriers in the facilitated transport film 20a is adjusted to be in the above-described range, salting-out before application can be suitably prevented in a composition (coating material) used for forming the facilitated transport film 20a. Further, when the content of the carriers in the facilitated transport film 20a is adjusted to be in the above-described range, the facilitated transport film 20a can reliably exhibit the function of separating out acidic gas.

The facilitated transport film 20a (composition used for forming the facilitated transport film 20a) may contain various components as needed in addition to such a hydrophilic compound, a crosslinking agent, and a carrier.

Examples of such a component include an antioxidant such as dibutylhydroxytoluene (BHT); a specific compound such as a compound which includes an alkyl group having 3 to 20 carbon atoms or a fluorinated alkyl compound having 3 to 20 carbon atoms and a hydrophilic group, or a compound having a siloxane structure; a surfactant such as sodium octanate or sodium 1-hexasulfonate; and polymer particles such as polyolefin particles or polymethyl methacrylate particles.

In addition, if necessary, a catalyst, a moisturizing agent (moisture absorbent), a co-solvent, a film strength control agent, or a defect detection agent may be used.

The acidic gas separation layer 20 is configured of such a facilitated transport film 20a and the porous support 20b.

The porous support 20b has acidic gas permeability, allows application of a coating composition (capable of supporting a coating film) for forming the facilitated transport film 20a to be performed thereon, and supports the formed facilitated transport film 20a.

Various kinds of known materials can be used as the materials for forming the porous support 20b when the materials can exhibit the above-described function.

In the separation module 10 of the present invention, the porous support 20b constituting the acidic gas separation layer 20 may be formed of a single layer. However, it is preferable that the porous support 20b constituting the acidic gas separation layer 20 has a two-layer structure formed of a porous film and an auxiliary support film. When the porous support 20b has such a two-layer structure, the porous support 20b more reliably exhibits functions of the application of a coating composition which becomes the facilitated transport film 20a and the support of the facilitated transport film 20a.

Moreover, in the case where the porous support 20b is formed of a single layer, examples of various materials for the following porous film and the auxiliary support film can be used as the formation material thereof.

In the porous support 20b having the two-layer structure, the porous film becomes the facilitated transport film 20a side.

It is preferable that the porous film has heat resistance and is formed of a material having low hydrolyzability. Specific examples of such a porous film include a membrane filter film such as those of polysulfone, polyethersulfone, polypropylene, or cellulose; an interfacial polymerization thin film such as those of polyamide or polyimide; and a stretched porous film such as those of polytetrafluoroethylene (PTFE) or high molecular weight polyethylene.

Among these, a stretched porous film such as PTFE or high-molecular-weight polyethylene is preferable from viewpoints of having high porosity, less diffusion inhibition of acidic gas (particularly, carbon dioxide), strength, production suitability, and the like. Among stretched porous films, a stretched porous film of PTFE is preferably used in terms of heat resistance, less hydrolyzability, and the like.

In order for the facilitated transport film 20a containing moisture to easily infiltrate into a porous portion in a use environment and for performance of film thickness distribution or aging not to be degraded, it is preferable that the porous film is hydrophobic.

The maximum pore diameter of the porous film is preferably 1 µm or less.

Further, the average pore diameter of the porous film is preferably in a range of 0.001 µm to 10 µm, more preferably in a range of 0.002 µm to 5 µm, and particularly preferably in a range of 0.005 µm to 1 µm. When the average pore diameter of the porous film is adjusted to be in the above-described range, an adhesive sufficiently permeates into a region to be coated with the adhesive described below, and it is possible to suitably prevent the porous film from inhibiting passing through of acidic gas.

The auxiliary support film is provided for reinforcing the porous film.

Various kinds of material can be used for the porous support film as long as the strength, drawing resistance, and gas permeability to be required for the film are satisfied. For example, non-woven fabric, woven fabric, a net, and a mesh having an average pore diameter of 0.001 µm to 10 µm can be appropriately selected and used.

It is preferable that the auxiliary support film is formed of a material which has heat resistance and low hydrolyzability similar to the porous film described above.

As fibers constituting the non-woven fabric, woven fabric, or knitted fabric, fibers formed of polyolefin such as polypropylene (PP); reforming polyamide such as ARAMID (trade name); and a fluorine-containing resin such as polytetrafluoroethylene or polyvinylidene fluoride which have excellent durability and heat resistance are preferable. It is preferable that the same materials are used for resin materials constituting a mesh. Among these materials, a particularly suitable example is non-woven fabric formed of polypropylene (PP) which is inexpensive and has high mechanical strength.

When the porous support 20b includes the auxiliary support film, the mechanical strength can be improved. For this reason, even though handling is performed by a coating device using a roll-to-roll system (hereinafter, also referred to as RtoR) described below, it is possible to prevent the porous support 20b from becoming wrinkled and the productivity can be improved.

When the porous support 20b is thin, strength is a problem. In consideration of this point, the film thickness of the porous film is preferably in a range of 5 μm to 100 μm and the film thickness of the auxiliary support film is in a range of 50 μm to 300 μm.

In the case where the porous support 20b is formed of a single layer, the thickness of the porous support 20b is preferably in the range of 30 μm to 500 μm.

The acidic gas separation layer 20 can be produced using a so-called coating method in which a liquid coating composition (coating material/coating solution) containing a component which becomes the facilitated transport film 20a is prepared and the porous support 20b is coated with the coating composition and dried.

That is, first, a coating composition which becomes the facilitated transport film 20a can be prepared by adding respectively appropriate amounts of a hydrophilic compound, a carrier, and other components to be added if necessary to water (room temperature water or hot water) and sufficiently stirring the solution.

In the preparation of the coating composition, dissolution of each component may be promoted by stirring and heating the solution if necessary. In addition, after a hydrophilic compound is added to water and dissolved therein, deposition (salting-out) of the hydrophilic compound can be effectively prevented by gradually adding a carrier to the solution and stirring the same.

The acidic gas separation layer 20 is prepared by coating the porous support 20b with the composition and drying the porous support.

Here, the application and the coating of the composition may be performed with a cut sheet-like porous support 20b, a so-called sheet type, which is cut to have a predetermined size.

Preferably, the preparation of the acidic gas separation layer 20 is performed by so-called RtoR. That is, the porous support 20b is sent from a feeding roll formed by being wound around a long porous support 20b, conveyed in the longitudinal direction, and coated with the prepared composition. Next, the coating composition (coating film) which is applied to the support is dried, the acidic gas separation layer 20 is obtained by forming the facilitated transport film 20a on the surface of the porous support 20b, and the prepared acidic gas separation layer 20 is wound.

The conveying speed of the porous support 20b in RtoR may be appropriately set according to the kind of porous support 20b or the viscosity of the coating solution.

Here, when the conveying speed of the porous support 20b is extremely high, the uniformity in film thickness of a coating film of the coating composition may be decreased. Further, when the conveying speed thereof is extremely low, the productivity is decreased. When this point is considered, the conveying speed of the porous support 20b is preferably 0.5 m/min or greater, more preferably 0.75 m/min to 200 m/min, and particularly preferably 1 m/min to 200 m/min.

Various kinds of known method can be used as the method of applying the coating composition.

Specific examples thereof include a curtain flow coater, an extrusion die coater, an air doctor coater, a blade coater, a rod coater, a knife coater, a squeeze coater, a reverse roll coater, and a bar coater.

Further, when the acidic gas separation layer 20 is formed using a coating method, a coating composition may be allowed to infiltrate into the porous support 20b such as unwoven fabric from a viewpoint of providing mechanical strength. Alternatively, a method of infiltrating the coating composition into unwoven fabric or the like, coating the unwoven fabric with the coating composition, and disposing the unwoven fabric on the porous support 20b can be used. In addition, when a continuous film is formed as a facilitated transport film and airtightness is secured by the acidic gas separation layer 20, infiltration of the coating composition into the entire surface of the porous support 20b is not necessary and a portion of the surface thereof may be infiltrated by the coating composition.

The coating film of the coating composition may be dried using a known method. As an example, a drying method using hot air is exemplified.

The air speed of the hot air may be appropriately determined by setting a speed thereof which can rapidly dry a gel membrane and at which the gel membrane does not collapse. Specifically, the air speed thereof is preferably in a range of 0.5 m/min to 200 m/min, more preferably in a range of 0.75 m/min to 200 m/min, and particularly preferably in a range of 1 m/min to 200 m/min.

The temperature of the hot air may be determined by appropriately setting a temperature at which deformation or the like of the porous support 20b does not occur and the gel membrane can be rapidly dried. Specifically, the temperature of the film surface is preferably in a range of 1° C. to 120° C., more preferably 2° C. to 115° C., and particularly preferably 3° C. to 110° C.

The porous support 20b may be heated for drying the coating film if necessary.

As described above, in the porous support 20b of the acidic gas separation layer 20, at least the surface on a side in contact with the facilitated transport film 20a has a hydrophobicity from a viewpoint of suppressing permeation of the facilitated transport film 20a or the coating composition which becomes the facilitated transport film 20a.

Further, since the facilitated transport film 20a is required to hold a large amount of moisture in the film in order to make a carrier sufficiently function, a polymer having extremely high water absorption properties and water-retaining properties is used. In addition, the water absorption amount increases in the facilitated transport film 20a and separation performance of the acidic gas improves as the content of a carrier such as a metal carbonate becomes larger. For this reason, the facilitated transport film 20a is likely to be a gel film or a film having low viscosity. Further, at the time of separating out of the acidic gas, the raw material gas, for example, in a temperature range of 100° C. to 130° C. and at a humidity of approximately 90% is supplied at a pressure of approximately 1.5 MPa. Consequently, due to this use, the separation layer gradually permeates into the porous support 20b and separation performance of the acidic gas tends to be degraded with time.

In order to prevent such inconvenience, it is preferable that the acidic gas separation layer 20 includes an intermediate layer, which more effectively suppresses permeation of the facilitated transport film 20a into the porous support 20b, between the porous support 20b and the facilitated transport film 20a.

The intermediate layer is not particularly limited as long as the layer has gas permeability with hydrophobicity, but it is preferable that the intermediate layer has air conductivity and is a layer denser than the porous support 20b. When such an intermediate layer is included, it is possible to prevent the facilitated transport film 20a having high uniformity from infiltrating into the porous support 20b.

The intermediate layer may be formed on the porous support 20b or may have an infiltration region which infiltrates into the porous support 20b. It is preferable that the infiltration region is smaller within a range in which properties of adhesion of the porous support 20b to the intermediate layer are excellent.

As the intermediate layer, a polymer layer (silicone resin layer) having a siloxane bond in a repeating unit is preferable. Examples of the polymer layer include silicone-containing polyacetylene such as organopolysiloxane (a silicone resin) or polytrimethyl silyl propyne. As a specific example of the organopolysiloxane, an organopolysiloxane represented by the following formula is exemplified.

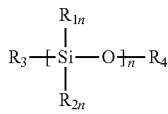

Further, in the formula above, n represents an integer of 1 or greater. Here, from viewpoints of availability, volatility, and viscosity, the average value of n is preferably in a range of 10 to 1,000,000 and more preferably in a range of 100 to 100,000.

In addition, $R_{1n}$, $R_{2n}$, $R_3$, and $R_4$ each independently represent any one selected from a group consisting of a hydrogen atom, an alkyl group, a vinyl group, an aralkyl group, an aryl group, a hydroxyl group, an amino group, a carboxyl group, and an epoxy group. Further, n number of $R_{1n}$'s and $R_{2n}$'s may be the same as or different from each other. In addition, an alkyl group, an aralkyl group, and an aryl group may have a ring structure. Further, the alkyl group, the vinyl group, the aralkyl group, and the aryl group may include a substituent and the substituent is selected from an alkyl group, a vinyl group, an aryl group, a hydroxyl group, an amino group, a carboxyl group, an epoxy group, and a fluorine atom. These substituents can further include a substituent if possible.

As an alkyl group, a vinyl group, an aralkyl group, and an aryl group selected for $R_{1n}$, $R_{2n}$, $R_3$, and $R_4$, from a viewpoint of availability, an alkyl group having 1 to 20 carbon atoms, a vinyl group, an aralkyl group having 7 to 20 carbon atoms, and an aryl group having 6 to 20 carbon atoms are preferable.

Particularly, it is preferable that $R_{1n}$, $R_{2n}$, $R_3$, and $R_4$ represent a methyl group or an epoxy-substituted alkyl group, and epoxy-modified polydimethyl siloxane (PDMS) or the like can be suitably used.

The intermediate layer is a film having gas permeability, but the gas permeability can be significantly degraded when the thickness thereof is large. The intermediate layer may be thin if the intermediate layer entirely covers the surface of a hydrophobic porous body without any space left.

From this viewpoint, the film thickness of the intermediate layer is preferably in a range of 0.01 μm to 30 μm and more preferably in a range of 0.1 μm to 15 μm.

It is preferable that such an intermediate layer is formed by a coating method.

A coating composition (second coating composition) which becomes an intermediate layer may include a monomer, a dimer, a trimer, an oligomer, or a prepolymer of a compound which becomes an intermediate layer of the above-described PDMS derivative, or a normal coating composition (coating solution/coating material) which contains a mixture of these and is used for forming a resin layer (resin film) according to a coating method. The coating composition may be formed by dissolving (dispersing) a monomer or the like in an organic solvent and may further include a curing agent, a curing accelerator, a crosslinking agent, a thickener, a reinforcing agent, or a filler.

The coating composition which becomes such an intermediate layer may be prepared by a known method.

Moreover, various kinds of known coating methods of the coating composition which becomes an intermediate layer can be used similar to the case of the coating composition which becomes the above-described facilitated transport film 20a. The thickness of the coating film of the coating composition may be appropriately set according to the kind of intermediate layer to be formed and the concentration of the coating composition such that the thickness of the intermediate layer is in a range of 0.01 μm to 30 μm as described above.

As a method of curing the coating composition, various kinds of known methods such as UV irradiation, heating and curing, and electron beam irradiation can be used according to a monomer which becomes an intermediate layer. In addition, the coating composition may be dried by evaporating an organic solvent as needed before the curing composition is cured.

In addition, an intermediate layer may be formed using so-called RtoR in the same manner as that of the facilitated transport film 20a.

In a case where the acidic gas separation layer 20 includes such an intermediate layer between the porous support 20b and the facilitated transport film 20a, an intermediate layer is formed on the porous support 20b and then the facilitated transport film 20a is formed on the intermediate layer in the same manner as described above.

The permeating gas channel member 26 is further laminated on the laminate 14.

The permeating gas channel member 26 is a member for allowing the acidic gas Gc having permeated into the acidic gas separation layer 20 by reacting with a carrier to flow into the through-holes 12a of the central tube 12.

As described above, the laminate 14 has a pinching body 36 formed by interposing the supply gas channel member 24 between the acidic gas separation layers 20 which are folded into two so that the facilitated transport film 20a is inside. One laminate 14 is configured by laminating the permeating gas channel member 26 on the pinching body 36 and bonding the permeating gas channel member 26 to the pinching body 36 using the adhesive layer 30.

The permeating gas channel member 26 functions as a spacer between the laminates 14 and forms a channel of the acidic gas Gc that reaches the through-holes 12a of the central tube 12 toward the center of the winding (inside) of the laminates 14 and is separated from the raw material gas G.

As described above, the adhesive layer 30 is formed in the inside of the permeating gas channel member 26. For the purpose of suitably forming the adhesive layer 30, infiltration of the adhesive layer 30 (adhesive 30a) described below into the permeating gas channel member 26 is required. From this viewpoint, as the permeating gas channel member 26, a member having a mesh-like structure (net-like/woven fabric-like/network structure) is preferable.

In the separation module 10 of the present invention, the permeating gas channel member 26 allows a difference in high-pressure deformation amount between a position at which the adhesive layer 30 is formed (forming region of the adhesive layer 30) and a position other than such a position (position at which the adhesive layer 30 is not formed (non-forming region of the adhesive layer 30)) to be set to 100 μm or less.

According to the present invention, with the above-described configuration, the separation module 10 which is operated at a high temperature (for example, 50° C. or higher), prevents deterioration or damage to the facilitated transport film 20a caused by the raw material gas G being supplied at a high pressure, and exhibits a predetermined performance for a long period of time.

As described above, the raw material gas G in the separation module 10 flows into the laminate wound product 14a from the end portion of the supply gas channel member 24 in the width direction (arrow x direction), flows into the supply gas channel member 24 in the width direction, and is brought into contact with the facilitated transport film 20a of the acidic gas separation layer 20 and from which the acidic gas Gc is separated by a carrier.

The separated acidic gas Gc is transported into the facilitated transport film 20a by a carrier, passes through the porous support 20b, flows into the permeating gas channel member 26, flows into the central tube 12 from the permeating gas channel member 26, and is discharged from the open end 12b. In addition, the residual gas Gr remaining after separation of acidic gas Gc is discharged from the end portion on the side opposite to the supply side of the supply gas channel member 24.

It is preferable that the separation module 10 of the present invention separates the acidic gas Gc from the raw material gas G containing moisture under a temperature condition of 50° or higher.

In the separation module 10, the permeating gas channel member 26 is mesh-like in order to be operated as a spacer of two layers of the acidic gas separation layers 20 and to form a channel of the acidic gas Gc separated from the raw material gas G and having permeated through the acidic gas separation layer 20 as described above.

In addition, the adhesive layer 30 is formed on the permeating gas channel member 26 so that porous support 20b (pinching body 36) of the acidic gas separation layer 20 is bonded thereto and the laminates 14 bond to each other. Further, the adhesive layer 30 (adhesive 30a which becomes the adhesive layer 30) infiltrates the porous support 20b and the permeating gas channel member 26, thereby forming an envelope-like channel of the acidic gas Gc in the inside of the permeating gas channel member 26.

In this manner, the separation module 10 seals the acidic gas Gc having permeated through the acidic gas separation layer 20 in the permeating gas channel member 26, regulates the direction of a channel towards the central tube 12, and prevents the acidic gas Gc having permeated through the acidic gas separation layer 20 from being mixed with the raw material gas G or the residual gas Gr.

The raw material gas G under the conditions of a high temperature and a high humidity is normally supplied to the separation module 10 using the facilitated transport film 20a at a high pressure of approximately 500 kPa to 10000 kPa. Further, the temperature of the raw material gas G is frequently high.

For this reason, when the acidic gas Gc is separated from the raw material gas G, the laminate wound product 14a is in a state of a high temperature and a high humidity and high pressure is applied to the inside of the laminate wound product 14a (supply gas channel member 24).

Figure 3A:
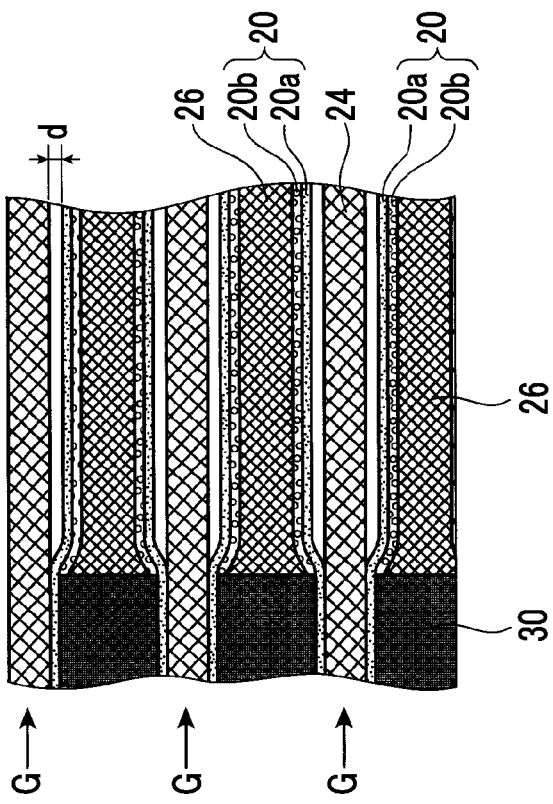
FIGS. 3A and 3B are conceptual views for describing an action of the acidic-gas separation module of the present invention.

Respective members (respective layers) of such a facilitated transport type separation module 10 are laminated on each other in a contact state as conceptually illustrated in FIG. 3A when the raw material gas G is not supplied (pressure is not applied).

On the contrary, when the raw material gas G is supplied, the acidic gas separation layer 20 and the permeating gas channel member 26 are pressurized by the pressure of the raw material gas G. Moreover, the permeating gas channel member 26 becomes softened because the permeating gas channel member 26 is operated at a high temperature compared to a case where the permeating gas channel member 26 is not operated.

Figure 3B:
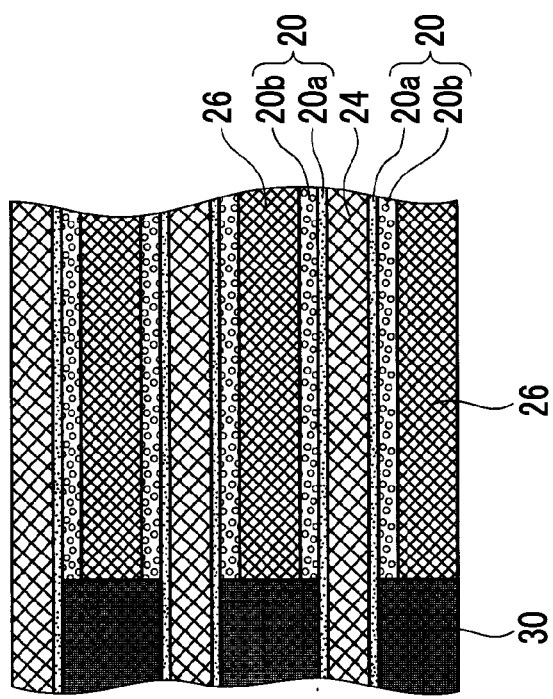

As a result, the raw material gas G is supplied, the mesh-like permeating gas channel member 26 is compressed in the thickness direction as conceptually illustrated in FIG. 3B. Further, the porous support 20b is compressed by this pressure. Moreover, the acidic gas separation layer 20 laminated on the permeating gas channel member 26 is pressed by the pressure of the gas in the same manner as described above and follows the permeating gas channel member 26.

The compression amount of the permeating gas channel member 26 is different between a position at which the adhesive layer 30 is formed and a position other than such a position. That is, since the position at which the adhesive layer 30 is formed is hard, the compression amount is significantly less than other positions (positions without the adhesive layer 30).

As a result, a difference d in level is generated in the facilitated transport film 20a between a region where the adhesive layer 30 is formed and a region other than the region in the permeating gas channel member 26 and the acidic gas separation layer 20 as conceptually illustrated in FIG. 3B.

As described above, the facilitated transport film 20a is formed by carrying a carrier to a hydrophilic compound serving as a binder and is soft. Particularly, since the facilitated transport film 20a absorbs moisture (water vapor) contained in the raw material gas G, the facilitated transport film 20a becomes extremely soft during the separation of the acidic gas Gc from the raw material gas G.

For this reason, when a difference d in level is generated, a load is applied to a portion with the difference in level of the soft facilitated transport film 20a depending on the size of the difference d in level. Consequently, the facilitated transport film 20a is deteriorated or damaged. In an extreme case, the facilitated transport film 20a is broken and becomes defective. Deterioration or damage of the facilitated transport film 20a and generation of a defective portion are causes of a decrease in the acidic gas separation efficiency or release of the raw material gas G, and then the performance of the separation module is degraded.

Meanwhile, in the separation module 10 of the present invention, a difference in high-pressure deformation amount of the permeating gas channel member 26 between a position at which the adhesive layer 30 is formed and a position other than such a position is set to 100 μm or less.

According to the present invention, for this reason, a difference d in level can be adjusted to be low even when the permeating gas channel member 26 is compressed by the supply of the raw material gas G and a difference d in level is generated in the facilitated transport film 20a. As a result, the separation module 10 which is capable of preventing damage, deterioration or breakage of the facilitated transport film 20a due to the difference in level of the facilitated transport film 20a and exhibits a predetermined performance for a long period of time can be obtained.

In the separation module 10 of the present invention, when a difference in high-pressure deformation amount of the permeating gas channel member 26 between a position at which the adhesive layer 30 is formed and a position other than such a position exceeds 100 μm, the difference d in level of the facilitated transport film 20a due to the supply of the raw material gas G becomes larger and thus damage or deterioration is likely to occur in the facilitated transport film 20a.

Moreover, in the present invention, a difference in high-pressure deformation amount between a position at which the adhesive layer 30 is formed and a position other than such a position is preferably 80 μm or less and more preferably 70 μm or less. In this manner, it is possible to further reduce the difference d in level of the facilitated transport film 20a due to the supply of the raw material gas G and to suitably prevent damage or deterioration of the facilitated transport film 20a.

Further, in the present invention, the high-pressure deformation amount indicates a strain amount in a pressing direction when a pressure of 2 MPa is applied in an environment of a temperature of 80° C. and a relative humidity of 80% RH. The strain amount in the pressing direction indicates an amount of a member to be pressed down due to pressure.

Preferably, using a test piece having a size of 20 mm in an environment of a temperature of 80° C. and a relative humidity of 80% RH in conformity with JIS K6272, the high-pressure deformation amount is a compression length at a position where the compressive stress reaches 2 MPa at the time when the test piece is compressed at a compression rate of 1 mm/min.

It is preferable that the thickness of the permeating gas channel member 26 is 600 μm or less.

When the thickness of the permeating gas channel member 26 is adjusted to 600 μm or less, damage or deterioration of the facilitated transport film 20a can be more desirably prevented by reducing the difference d in level of the facilitated transport film 20a due to the supply of the raw material gas G.

When this point is considered, the thickness of the permeating gas channel member 26 is more preferably 550 μm or less.

A material in which a difference in high-pressure deformation amount between a position at which the adhesive layer 30 is formed and a position other than such a position can be set to 100 μm can be used as a material for forming the permeating gas channel member 26 according to the hardness of the adhesive layer 30, the shape of the permeating gas channel member 26 (for example, a weaving method in a case of woven fabric), and the thickness or the density of the permeating gas channel member 26.

Specific examples thereof include ceramic, glass, modified glass, carbon, modified polypropylene, and polyphenylene sulfide (PPS). Among these, ceramic, glass, carbon, modified polypropylene, or PPS is preferable. Further, modified polypropylene is a material in which the surface of a mesh or the like formed of polypropylene is modified (coated) with an adhesive such as an epoxy-based adhesive or a resin material.

More specifically, preferred examples of the material of the permeating gas channel member 26 include woven fabric (mesh) of epoxy-modified polypropylene, glass cloth, porous glass, and PPS mesh.

Moreover, the woven fabric of epoxy-modified polypropylene is obtained by immersing polypropylene fibers in an epoxy resin such as an epoxy-based adhesive, adhering the epoxy resin to the surface thereof, and performing weaving with fibers formed by curing the epoxy resin or by immersing polypropylene woven fabric in an epoxy resin, adhering the epoxy resin to the surface thereof, and curing the epoxy resin. Woven fabric obtained by various kinds of known weaving methods can be used.

As a mesh or woven fabric formed of a material modified by epoxy, one obtained by modifying a product formed of a material which is not hydrolyzed such as PTFE, polyvinylidene fluoride (PVDF), polyethylene (PE), or polystyrene (PS) in addition to polypropylene (PP) can be used.

As conceptually illustrated in FIG. 4B, normal woven fabric is weaved such that warp threads and well threads are alternately arranged.

Meanwhile, in a case where woven fabric (knitting) is used as the permeating gas channel member 26 is used in the separation module 10 of the present invention, woven fabric weaved such that fabrics which form the permeating gas channel member 26 (woven fabric) and extend in the same direction as the plane direction are laminated on each other in the thickness direction is preferably used as conceptually illustrated in FIG. 4A. That is, in a case where woven fabric is used in the separation module 10 of the present invention as the permeating gas channel member 26, woven fabric weaved such that warp threads and weft threads overlap each other in the thickness direction is preferably used.

When woven fabric weaved such that fibers overlap each other is used, compression of the permeating gas channel member 26, that is, the difference d in level of the facilitated transport film 20a is further reduced and damage or deterioration of the facilitated transport film 20a can be suitably prevented.

As described above, the permeating gas channel member 26 becomes a channel of the acidic gas Gc permeating into the acidic gas separation layer 20 which is separated from the raw material gas G.

Accordingly, it is preferable that resistance to flowing gas is small in the permeating gas channel member 26. Specifically, a member which has a high porosity and has a low pressure loss is preferable.

The porosity of the permeating gas channel member 26 is preferably in a range of 30% to 99%, more preferably in a range of 35% to 97.5%, and particularly preferably in a range of 40% to 95%.

Moreover, the pressure loss can be approximated by a flow rate loss of compressed air flowing at a constant flow rate. Specifically, when air is allowed to flow in the permeating gas channel member 26 having a dimension of 15 cm$^2$ at a rate of 15 L (liter)/min at room temperature, the flow rate loss is preferably less than 7.5 L/min and more preferably less than 7 L/min.

Hereinafter, a method of laminating the laminate 14 and a method of winding the laminated laminates 14, that is, a method of preparing the laminate wound product 14a will be described. Further, for the purpose of clearly showing the configuration by simplifying the drawings, FIGS. 5A to 9 used for description below illustrate only the end surfaces (end portions) of the supply gas channel member 24 and the permeating gas channel member 26 as a net shape.

First, as conceptually illustrated in FIGS. 5A and 5B, the end portion of the permeating gas channel member 26 is fixed to the central tube 12 using a fixing means 34 such as a Kapton tape or an adhesive by matching the extending direction and the lateral direction of the central tube 12 to each other. As described above, the permeating gas channel member 26 is selected according to the adhesive layer 30 described below such that a difference in high-pressure deformation amount between a position at which the adhesive layer 30 is formed and a position other than such a position is set to 100 μm.

It is preferable that a slit (not illustrated in the figure) is provided on the tube wall of the central tube 12 along the axial direction. In this case, the tip portion of the permeating gas channel member 26 is put into the slit so as to be fixed to the inner peripheral surface of the central tube 12 using the fixing means. According to this configuration, when a laminate including the permeating gas channel member 26 is wound around the central tube 12, release of the permeating gas channel member 26 from the slit can be prevented due to friction between the inner peripheral surface of the central tube 12 and the permeating gas channel member 26 even if the laminate is wound around the central tube 12 while tension is applied thereto, that is, the fixation of the permeating gas channel member 26 is maintained.

Figure 6:
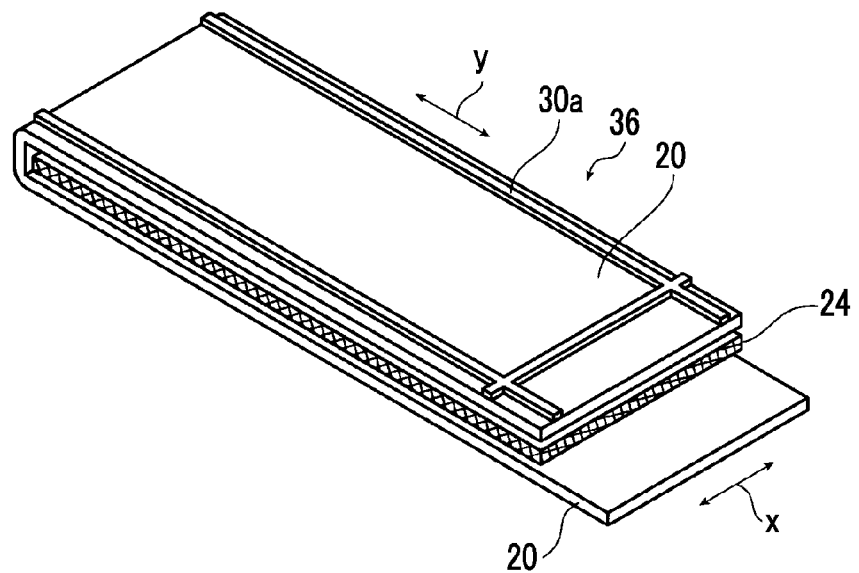
FIG. 6 is a conceptual view for describing the method of preparing the acidic-gas separation module illustrated in FIG. 1.

Moreover, as conceptually illustrated in FIG. 6, the supply gas channel member 24 is interposed between the acidic gas separation layers 20 folded into two so that the facilitated transport film 20a is inside. That is, the supply gas channel member 24 is made into the pinching body 36 interposed between the acidic gas separation layers 20 folded into two. In addition, at this time, the acidic gas separation layer 20 is not uniformly folded into two. As illustrated in FIG. 6, the acidic gas separation layer 20 is folded into two such that one side is slightly longer.

Further, in order to prevent damage to the facilitated transport film 20a caused by the supply gas channel member 24, it is preferable that a sheet-like protection member folded into two is arranged in a valley portion obtained by folding the acidic gas separation layer 20 into two. As the protection member, a Kapton tape or a PTFE tape is exemplified.

Further, the surface on the shorter side of the acidic gas separation layer 20 folded into two (surface of the porous support 20b) is coated with the adhesive 30a which becomes the adhesive layer 30. The adhesive layer 30 and the adhesive 30a will be described below.

Here, the adhesive 30a (that is, the adhesive layer 30) is applied to the entire region by being extended to have a strip shape in the winding direction (arrow y direction) in the periphery of both end portions in the width direction (arrow x direction) as illustrated in FIG. 6, and is further applied to the entire region by being extended to have a strip shape in the periphery of the end portion on the side opposite to the folded portion.

Figure 7A:
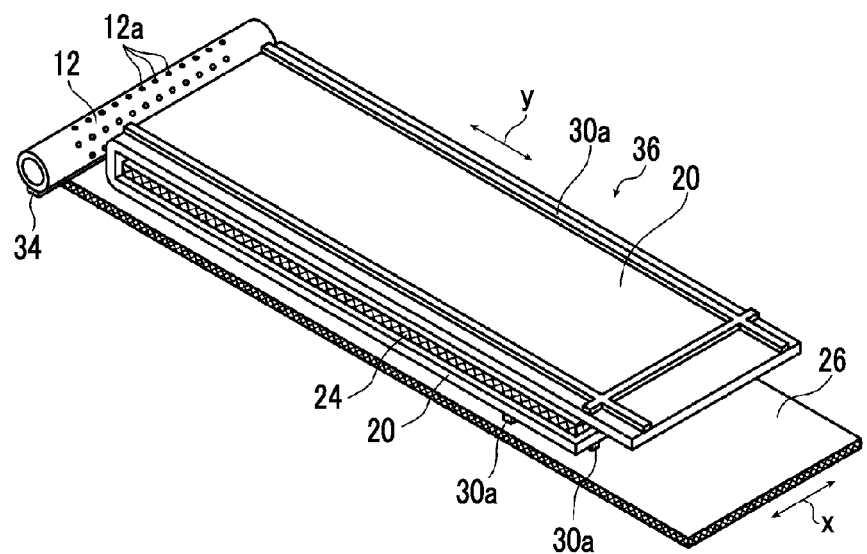
FIGS. 7A and 7B are conceptual views for describing the method of preparing the acidic-gas separation module illustrated in FIG. 1.
Figure 7B:
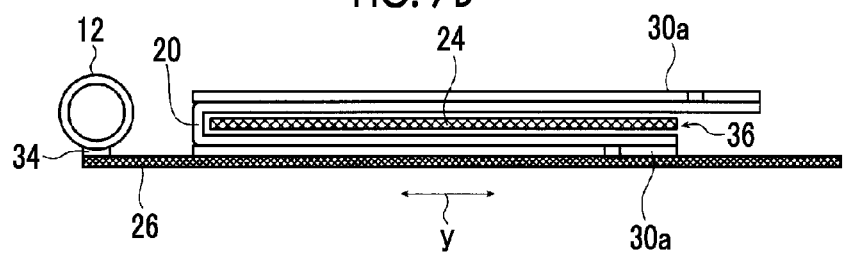

Next, as conceptually illustrated in FIGS. 7A and 7B, the pinching body 36 is laminated on the permeating gas channel member 26 fixed to the central tube 12 and the permeating gas channel member 26 is bonded to the acidic gas separation layer 20 (porous support 20b) by allowing the surface coated with the adhesive 30a to face the permeating gas channel member 26 and allowing the folded side to face the central tube 12.

Further, as illustrated in FIGS. 7A and 7B, the upper surface of the laminated pinching body 36 (the surface on the longer side of the porous support 20b) is coated with the adhesive 30a which becomes the adhesive layer 30. Moreover, in the description below, a direction of the side opposite to the permeating gas channel member 26 initially fixed to the central tube 12 by fixing means 34 is also referred to as the upper side.

As illustrated in FIGS. 7A and 7B, the adhesive 30a is also applied to the entire region by being extended to have a strip shape in the winding direction in the periphery of both end portions in the width direction in the same manner as described above, and is further applied to the entire region by being extended to have a strip shape in the periphery of the end portion on the side opposite to the folded portion.

Figure 8:
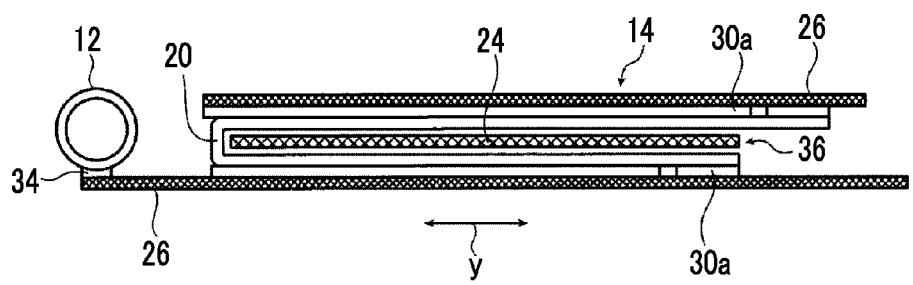
FIG. 8 is a conceptual view describing the method of preparing the acidic-gas separation module illustrated in FIG. 1.

Next, as conceptually illustrated in FIG. 8, the permeating gas channel member 26 is laminated on the pinching body 36 coated with the adhesive 30a, the acidic gas separation layer 20 (porous support 20b) is bonded to the permeating gas channel member 26, and then the laminate 14 is formed.

Subsequently, as illustrated in FIG. 6, in the same manner as described above, the pinching body 36 between which the supply gas channel member 24 is interposed is prepared using the acidic gas separation layer 20, the pinching body is coated with the adhesive 30a which becomes the adhesive layer 30, and the finally laminated permeating gas channel member 26 is laminated on the pinching body 36 such that they bond to each other by allowing the side coated with the adhesive to face the lower side.

In addition, in the same manner as described above, the upper surface of the laminated pinching body 36 is coated with the adhesive 30a as illustrated in FIGS. 7A and 7B, the permeating gas channel member 26 is laminated thereon as illustrated in FIG. 8 such that they bond to each other, and then the second layer of the laminate 14 is laminated thereon.

Hereinafter, the processes of FIGS. 6 to 8 are repeatedly performed, and a predetermined number of sheets of laminates 14 are laminated as conceptually illustrated in FIG. 9.

Figure 9:
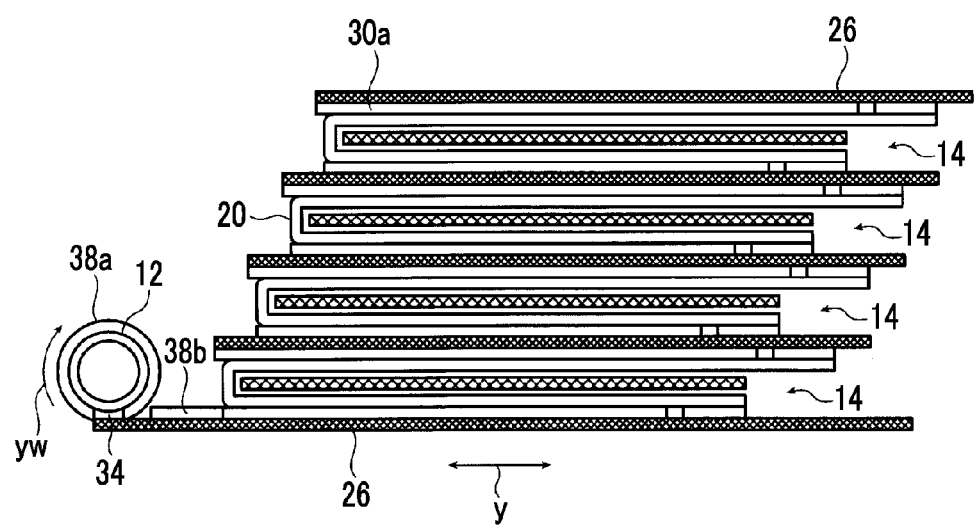
FIG. 9 is a conceptual view describing the method of preparing the acidic-gas separation module illustrated in FIG. 1.

It is preferable that the laminates 14 are laminated in order to become gradually farther away from the central tube 12 in the winding direction toward the upper side as illustrated in FIG. 9. In this manner, the winding of the laminates 14 around the central tube 12 (the laminates 14 are wrapped around the central tube 12) becomes easy and the end portion or the periphery of the end portion of the central tube 12 side of each permeating gas channel member 26 can be suitably brought into contact with the central tube 12.

When a predetermined number of laminates 14 are laminated on each other, an adhesive 38a is applied to the outer peripheral surface of the central tube 12 and an adhesive 38b is applied to a space between the pinching body 36 and the central tube 12 on the upper surface of the permeating gas channel member 26 initially fixed to the central tube 12 as illustrated in FIG. 9.

Next, as indicated by an arrow yw in FIG. 9, the laminates 14 are wound around the central tube 12 (the laminates 14 are wrapped around the central tube 14) such that the laminated laminates 14 are rolled up.

When the winding is finished, the state in which tension is applied to the permeating gas channel member 26 of the outermost periphery (that is, the lowermost layer initially fixed to the central tube 12) in the drawing direction (winding direction) is maintained for a predetermined time and the adhesive 30a or the like is dried.

When the predetermined time has elapsed, the permeating gas channel member 26 of the outermost periphery is fixed to a position, at which the permeating gas channel member has gone round once, by ultrasonic welding or the like, the extra permeating gas channel member 26 outward from the fixation position is cut, and then the laminate wound product 14a obtained by laminating the laminated laminates 14 around the central tube is completed.

As described above, the raw material gas G is supplied from the end portion of the supply gas channel member 24, and the acidic gas Gc passes through (is transported to) the acidic gas separation layer 20 in the lamination direction, flows into the permeating gas channel member 26, flows through the permeating gas channel member 26, and reaches the central tube 12.

Here, the porous support 20b is coated with the adhesive 30a and the permeating gas channel member 26 having a mesh-like structure is bonded using the adhesive 30a. Accordingly, the adhesive 30a infiltrates (impregnation) into the porous support 20b and the permeating gas channel member 26 and then the adhesive layers 30 are formed in the inside of the porous support 20b and the permeating gas channel member 26.

Further, as described above, the adhesive layer 30 (adhesive 30a) is formed to have a strip shape by being extended in the entire region in the winding direction in the periphery of both end portions in the width direction. In addition, the adhesive layer 30 is formed to have a strip shape by being extended in the entire region in the width direction in the periphery of the end portion on the side opposite to the folded portion which becomes the central tube 12 side such that the adhesive layer crosses the adhesive layer 30 in the width direction in the periphery of both end portions in the width direction. That is, the adhesive layer 30 is open at the central tube 12 side and is formed so as to enclose the outer periphery of the permeating gas channel member 26 and the porous support 20b. In addition, the permeating gas channel member 26 is brought into a state of being interposed between the facilitated transport films 20a.

In this manner, an envelope-like channel in which the central tube 12 side is open is formed in the permeating gas channel member 26 of the laminate 14.

Accordingly, the acidic gas Gc, which permeates into the acidic gas separation layer 20 and flows into the permeating gas channel member 26, flows through the permeating gas channel member 26 toward the central tube 12 without flowing out, and flows into the central tube 12 from the through-holes 12a. Further, the raw material gas G and the residual gas Gr are not mixed with the acidic gas Gc (acidic gas Gc in the permeating gas channel member 26) having permeated through the acidic gas separation layer 20 because the raw material gas G and the residual gas Gr are obstructed by the adhesive layer 30.

That is, the adhesive layer 30 bonds respective members to each other and plays a role of a channel regulation member of the acidic gas Gc and a sealing member that seals each gas in a predetermined region.

In the separation module 10 of the present invention, various kinds of known adhesive can be used as long as the adhesive layer 30 (adhesive 30a) has sufficient adhesive strength, heat resistance, and moisture resistance and a difference in high-pressure deformation amount between a position at which the adhesive layer 30 is formed and a position other than such a position can be set to 100 µm or less according to the permeating gas channel member 26.

Examples thereof include an epoxy resin, a vinyl chloride copolymer, a vinyl chloride-vinyl acetate copolymer, a vinyl chloride-vinylidene chloride copolymer, a vinyl chloride-acrylonitrile copolymer, a butadiene-acrylonitrile copolymer, a polyamide resin, polyvinyl butyral, polyester, a cellulose derivative (nitrocellulose or the like), a styrene-butadiene copolymer, various synthetic rubber resins, a phenol resin, a urea resin, a melamine resin, a phenoxy resin, a silicon resin, and a urea formamide resin.

Further, the adhesive 30a which becomes the adhesive layer 30 may be applied once, but it is preferable that an adhesive diluted with an organic solvent such as acetone is applied and then only the adhesive is applied to the same place. At this time, it is preferable that the adhesive diluted with an organic solvent is applied over a wide area and adhesive which is not diluted is applied in a width narrower than that of the adhesive diluted with an organic solvent.

In this manner, the adhesive layer 30 (adhesive 30a) can suitably infiltrate into the porous support 20b and the permeating gas channel member 26.

In the separation module 10 of the present invention, the telescoping prevention plate (telescoping prevention member) 16 is arranged in both end portions of the laminate wound product 14a prepared in this manner.

As described above, the telescoping prevention plate 16 is a member used for preventing a so-called telescoping phenomenon in which the laminate wound product 14a is pressed by the raw material gas G, the end surface on the supply side is pushed in a nested shape, and the end surface on the opposite side protrudes in a nested shape.

In the present invention, various kinds of known telescoping prevention plate used for a spiral-type separation module can be used as the telescoping prevention plate 16.

The telescoping prevention plate 16 includes a circular outer ring portion 16a; a circular inner ring portion 16b arranged such that the center thereof corresponds to the center of the outer ring portion 16a and is incorporated therein; and ribs (spokes) 16c which connect the outer ring portion 16a with the inner ring portion 16b such that they are fixed to each other. As described above, the central tube 12 around which the laminate 14 is wound is inserted into the inner ring portion 16b.

The ribs 16c are radially provided at an equal angle interval from the center of the outer ring portion 16a and the inner ring portion 16b. In the telescoping prevention plate 16, gaps of each rib 16c between the outer ring portion 16a and the inner ring portion 16b become opening portions 16d through which the raw material gas G or the residual gas Gr passes.

The telescoping prevention plate 16 may be arranged such that the telescoping prevention plate 16 is brought into contact with the end surface of the laminate wound product 14a. However, in order for the entire region of the end surface of the laminate wound product 14a to be used for supply of the raw material gas or discharge of the residual gas Gr, the end surfaces of the telescoping prevention plate 16 and the laminate wound product 14a are normally arranged with small gaps therebetween.

Various materials can be used when the materials of forming the telescoping prevention plate 16 have sufficient strength, heat resistance, and moisture resistance.

Preferred specific examples thereof include metal materials (such as stainless steel (SUS), aluminum, an aluminum alloy, tin, and a tin alloy); resin materials (such as a polyethylene resin, a polypropylene resin, an aromatic polyamide resin, nylon 12, nylon 66, a polysulfone resin, a polytetrafluoroethylene resin, a polycarbonate resin, an acrylic-butadiene-styrene resin, an acrylic-ethylene-styrene resin, an epoxy resin, a nitrile resin, a polyether ether ketone resin (PEEK), a polyacetal resin (POM), and a polyphenylene sulfide resin (PPS)); fiber-reinforced plastics of these resins (glass fibers, carbon fibers, stainless steel fibers, and aramid fibers are exemplified as fibers. Among these, long fibers are particularly preferable and specific examples thereof include long glass fiber-reinforced polypropylene and long glass fiber-reinforced polyphenylene sulfide); and ceramics (such as zeolite and alumina).

In addition, when a resin is used, a resin reinforced by glass fibers may be used.

The coating layer 18 is provided by covering the laminate wound product 14a or the peripheral surface of the telescoping prevention plate 16. The coating layer 18 blocks discharge of the raw material gas G or the residual gas Gr outside from the peripheral surface of the laminate wound product 14a. That is, the coating layer 18 blocks discharge of the raw material gas G or the residual gas Gr outside other than from the end surface of the peripheral surface of the laminate wound product 14a.

Various kinds of material which can shield the raw material gas G or the like from being discharged can be used as the coating layer 18. Further, the coating layer 18 may be a tubular member or may be configured by winding a wire or a sheet-like member.

As an example, a coating layer 18 obtained by impregnating a wire made of FRP with an adhesive used for the above-described adhesive layer 30 and winding the wire impregnated with the adhesive around the laminate wound product 14a or the telescoping prevention plate 16 multiple times without any space left if necessary is exemplified. Moreover, the coating layer 18 may be formed by known FRP processing.

At this time, as needed, a sheet-like member such as a Kapton tape which prevents permeation of an adhesive into the laminate wound product 14a may be provided between the coating layer 18 and the laminate wound product 14a.

Hereinbefore, the acidic-gas separation module (separation module) of the present invention has been described in detail, but the present invention is not limited to the examples described above. Further, various improvements or modifications are possible within the range not departing from the scope of the present invention.

EXAMPLES

Hereinafter, an acidic-gas separation module of the present invention will be described in detail with reference to specific examples of the present invention.

Example 1

<Preparation of Acidic Gas Separation Layer>

An aqueous solution containing 3.3% by mass of a polyvinyl alcohol-polyacrylic acid copolymer (KURASTOMER AP-20, manufactured by KURARAY CO., LTD.) and 0.016% by mass of a crosslinking agent (a 25 mass % glutaraldehyde aqueous solution, manufactured by Wako Pure Chemical Industries, Ltd.) was prepared. 1 M hydrochloric acid was added to the aqueous solution such that cross-linking was allowed to occur in the solution.

After cross-linking was allowed to occur in the solution, a 40% cesium carbonate aqueous solution (manufactured by Kisan Kinzoku Chemicals Co., Ltd.) was added thereto such that the concentration of cesium carbonate became 7.0% by weight and then the solution was defoamed, thereby preparing a coating composition. That is, in the present example, cesium carbonate became a carrier of the facilitated transport film 20a.

Next, the acidic gas separation layer 20 formed of the facilitated transport film 20a and the porous support 20b was prepared by coating the porous support 20b (laminate (manufactured by General Electric Company) obtained by laminating porous PTFE on the surface of PP non-woven fabric) with the coating composition and drying the support.

The thickness of the facilitated transport film 20a was set to 50 μm.

<Preparation of Separation Module>

The central tube 12 having a slit, extending in the central line direction, on the side surface thereof was prepared. The permeating gas channel member 26 was fixed to the slit of the central tube 12 such that the permeating gas channel member 26 was inserted thereinto. In this manner, as illustrated in FIGS. 5A and 5B, the end portion of the permeating gas channel member 26 in the winding direction was fixed to the peripheral surface of the central tube 12. Further, the central tube 12 was provided with partitions in the inside thereof.

Woven fabric of epoxy-modified polypropylene having a thickness of 350 μm was used by the permeating gas channel member 26.

In addition, the prepared acidic gas separation layer 20 was folded into two by putting the facilitated transport film 20a on the inside thereof. The acidic gas separation layer 20 was folded into two such that one side of the acidic gas separation layer 20 became slightly longer than the other as illustrated in FIG. 6. A fluorine-based tape was adhered to the valley portion of the acidic gas separation layers 20 folded into two for reinforcement so that the valley portion of the facilitated transport film 20a was not damaged by the end portion of the supply gas channel member 24. Further, pores of the porous support 20b of a folded portion were buried by an adhesive formed of an epoxy resin.

Next, the supply gas channel member 24 (a polypropylene net having a thickness of 0.5 mm) was interposed between the acidic gas separation layers 20 folded into two, thereby preparing the pinching body 36.

The adhesive 30a was applied to the entire region by being extended in the winding direction (arrow y direction) in the periphery of both end portions in the width direction (arrow x direction) and applied to the entire region by being extended in the width direction in the periphery of the end portion on the side opposite to the folded portion in the winding direction on the porous support 20b side, in which the acidic gas separation layer 20 of the pinching body 36 was shorter as illustrated in FIG. 6. An adhesive (E120HP, manufactured by Henkel Japan Ltd., Tokyo) formed of an epoxy resin having a viscosity of approximately 40 Pa·s was used as the adhesive 30a.

Next, as illustrated in FIGS. 7A and 7B, the side coated with the adhesive 30a was turned to face the lower side and the pinching body 36 was laminated on the permeating gas channel member 26 fixed to the central tube 12 such that they were bonded to each other.

Subsequently, as illustrated in FIG. 7A, the adhesive 30a was applied to the entire region by being extended in the winding direction in the periphery of both end portions in the width direction and applied to the entire region by being extended in the width direction in the periphery of the end portion on the side opposite to the folded portion in the winding direction on the upper surface of the acidic gas separation layer 20 of the pinching body 36 laminated on the permeating gas channel member 26. Further, the permeating gas channel member 26 was laminated on the acidic gas separation layer 20 coated with the adhesive 30a and the acidic gas separation layer 20 and the permeating gas channel member 26 were bonded to each other as illustrated in FIG. 8, thereby forming the first layer of the laminate 14.

Moreover, in regard to the permeating gas channel member 26 forming the adhesive layer 30, a difference in high-pressure deformation amount between a position at which the adhesive layer 30 was formed and a position other than such a position was measured. As a result, the difference in high-pressure deformation amount was 89 µm.

In the same manner as described above, another pinching body 36 formed of the acidic gas separation layer 20, illustrated in FIG. 6, was prepared and the adhesive 30a was similarly applied to the porous support 20b on a shorter acidic gas separation layer 20 side. Next, in the same manner as illustrated in FIG. 7A, the side coated with the adhesive 30a was turned to face the first layer of the laminate 14 (the permeating gas channel member 26 thereof) which was initially formed, the pinching body 36 was laminated on the first layer of the laminate 14 (permeating gas channel member 26), and the pinching body and the laminate 14 were bonded to each other. Moreover, the upper surface of the pinching body 36 was coated with the adhesive 30a in the same manner as illustrated in FIG. 7A, the permeating gas channel member 26 was laminated on the pinching body 36 in the same manner as illustrated in FIG. 8, and then the pinching body 36 and the permeating gas channel member 26 were bonded to each other, thereby forming the second layer of the laminate 14.

In addition, a laminate forming the third layer of the laminate 14 was formed on the second layer of the laminate 14 in the same manner as that of the second layer.

After the third layer of the laminate 14 was laminated on the permeating gas channel member 26 fixed to the central tube 12, the peripheral surface of the central tube 12 was coated with the adhesive 38a as illustrated in FIG. 9, and then the permeating gas channel member 26 between the central tube 12 and the lowermost layer of the laminate 14 was further coated with the adhesive 38b. As the adhesives 38a and 38b, the same materials as the adhesive 30a were used.

Next, the laminated twenty layers of the laminates 14 were wound around the central tube 12 multiple times such that the laminates 14 were rolled around the central tube 12 by the central tube 12 being rotated in the arrow yx direction of FIG. 9 and tension was applied in a direction in which the laminate 14 was pulled, the laminate wound product 14a thereby being obtained.

In addition, the central tube 12 was inserted into the inner ring portions 16b and telescoping prevention plates 16, made of PPS, containing 40% glass fibers in the form illustrated in FIG. 1 were attached to both end portions of the laminate wound product 14a.

Moreover, the coating layer 18 was foamed by performing FPR processing on the peripheral surface of the telescoping prevention plate 16 and the peripheral surface of the laminate wound product 14a, thereby preparing the separation module 10.

The total film area of three layers in the prepared separation module 10 was 1.2 m² (design value).

Example 2

The separation module 10 was prepared in the same manner as in Example 1 except that glass cloth having a thickness of 300 µm was used as the permeating gas channel member 26.

Further, when a difference in high-pressure deformation amount of the permeating gas channel member 26 between a position at which the adhesive layer 30 was fixated and a position other than such a position was measured, the value thereof was 71 µm.

Example 3

The separation module 10 was prepared in the same manner as in Example 1 except that a PPS mesh having a thickness of 460 µm was used as the permeating gas channel member 26.

Further, when a difference in high-pressure deformation amount of the permeating gas channel member 26 between a position at which the adhesive layer 30 was formed and a position other than such a position was measured, the value thereof was 52 µm.

Example 4

The separation module 10 was prepared in the same manner as in Example 1 except that an intermediate layer was formed on the surface of the porous support 20b before the facilitated transport film 20a was formed.

Further, when a difference in high-pressure deformation amount of the permeating gas channel member 26 between a position at which the adhesive layer 30 was formed and a position other than such a position was measured, the value thereof was 85 µm.

The intermediate layer was formed as follows.

UV9300 (manufactured by Momentive Performance Materials Inc.) was used as a silicone coating solution used for forming a silicone resin layer as an intermediate layer. 0.5% by weight of 4-isopropyl-4'methyldiphenyliodoniumtetrakis(pentafluorophenyl)borate (manufactured by Tokyo Chemical Industry Co., Ltd.), with respect to the content of the silicone resin, was added to the silicone coating solution as a curing agent, thereby preparing a coating composition used for forming an intermediate layer.

The porous support 20b was coated with the coating composition such that the thickness thereof became 10 µm and the porous support was irradiated with ultraviolet rays having an integrated light intensity of 500 mJ/cm², thereby forming an intermediate layer.

Example 5

40% by mass of cesium carbonate (manufactured by Kisan Kinzoku Chemicals Co., Ltd.) aqueous solution was added to an aqueous solution (copolymer concentration: 4.3% by mass) containing a copolymer of a polyvinyl alcohol (PVA)-polyacrylic acid copolymer (PAA) (molar ratio: PVA/PAA=3/7), which was synthesized by referencing a method described in "T. Sato, et al. (1993). Synthesis of poly(vinyl alcohol) having a thiol group at one end and new block copolymers containing poly(vinyl alcohol) as one cinsistent. Macromolecular Chemistry and Physics, 194, 175 to 185" such that the concentration of cesium carbonate became 6.0% by mass. In addition, Orgatix TC-100 (manufactured by Matsumoto Fine Chemistry Co., Ltd.) serving as a Ti-based crosslinking agent was added such that the content thereof was 10% by mass with respect to the content of the PVA-PAA copolymer and the mixture was stirred and defoamed, thereby obtaining a coating composition (2).

The separation module 10 was prepared in the same manner as in Example 1 except that the coating composition (2) was used in place of the coating composition (1).

Further, when a difference in high-pressure deformation amount of the permeating gas channel member 26 between a position at which the adhesive layer 30 was formed and a position other than such a position was measured, the value thereof was 81 µm.

The facilitated transport film of the separation module 10 contains a structural unit in which M in Formula (1) represents Ti. When the content of Ti in the facilitated transport film was measured using a fluorescent X-ray spectroscopy, the content of Ti was 1.1% by mass with respect to the content of the PVA-PAA copolymer serving as a hydrophilic compound. The content of Ti in the facilitated transport film was measured, according to the fluorescent X-ray spectroscopy, through quantification by performing analysis at a measurement area of 10 mmφ using Primusell (Rh-ray source) (manufactured by Rigaku Corporation).

Example 6

The separation module 10 was prepared in the same manner as in Example 4 except that the coating composition (2) was used in place of the coating composition (1).

Further, when a difference in high-pressure deformation amount of the permeating gas channel member 26 between a position at which the adhesive layer 30 was formed and a position other than such a position was measured, the value thereof was 77 μm.

Example 7

The separation module 10 was prepared in the same manner as in Example 5 except that Orgatix TC-100 (manufactured by Matsumoto Fine Chemistry Co., Ltd.) was added such that the content thereof became 1% by mass with respect to the content of PVA-PAA copolymer.

Further, when a difference in high-pressure deformation amount of the permeating gas channel member 26 between a position at which the adhesive layer 30 was formed and a position other than such a position was measured, the value thereof was 87 μm.

Further, when the content of Ti in the facilitated transport film was measured in the same manner as in Example 5, the content of Ti was 0.11% by mass with respect to the content of the PVA-PAA copolymer serving as a hydrophilic compound.

Example 8

The separation module 10 was prepared in the same manner as in Example 5 except that Orgatix TC-100 (manufactured by Matsumoto Fine Chemistry Co., Ltd.) was added such that the content thereof became 50% by mass with respect to the content of PVA-PAA copolymer.

Further, when a difference in high-pressure deformation amount of the permeating gas channel member 26 between a position at which the adhesive layer 30 was formed and a position other than such a position was measured, the value thereof was 78 μm.

Further, when the content of Ti in the facilitated transport film was measured in the same manner as in Example 5, the content of Ti was 5.3% by mass with respect to the content of the PVA-PAA copolymer serving as a hydrophilic compound.

Example 9

The separation module 10 was prepared in the same manner as in Example 5 except that Orgatix TC-401 (manufactured by Matsumoto Fine Chemistry Co., Ltd.) was used in place of Orgatix TC-100 (manufactured by Matsumoto Fine Chemistry Co., Ltd.) and was added such that the content thereof became 15% by mass with respect to the content of PVA-PAA copolymer.

Further, when a difference in high-pressure deformation amount of the permeating gas channel member 26 between a position at which the adhesive layer 30 was formed and a position other than such a position was measured, the value thereof was 80 μm.

Further, when the content of Ti in the facilitated transport film was measured in the same manner as in Example 5, the content of Ti was 1% by mass with respect to the content of the PVA-PAA copolymer serving as a hydrophilic compound.

Comparative Example 1

A separation module was prepared in the same manner as in Example 1 except that woven fabric made of polypropylene which was not modified by epoxy and having the same thickness as described above was used as the permeating gas channel member 26.

Further, when a difference in high-pressure deformation amount of the permeating gas channel member 26 between a position at which the adhesive layer 30 was formed and a position other than such a position was measured, the value thereof was 141 μm.

<Module Factor>

The module factors of the prepared separation modules of respective Examples and Comparative Examples were calculated by measuring respective separation factors of the separation modules and the facilitated transport film 20a on the porous support 20b used for the separation modules.

Further, in the present example, the $CO_2/N_2$ separation factor was measured at the initial stage and after an operation continued for 24 hours and the module factor was calculated at the initial stage and after the operation continued for 24 hours (hereinafter, also referred to as "after 24 hours").

(Measurement of Separation Factor of Separation Module)

Raw material gas G (flow rate: 1.72 L/min) having a $CO_2/N_2$ separation factor of "$N_2:CO_2:H_2O=66:21:13$ (partial pressure ratio)" was supplied to respective separation modules under the conditions of a temperature of 130° C. and a total pressure of 2001.3 kPa. In addition, gas having permeated was analyzed through gas chromatograph and the $CO_2/N_2$ separation factor ($\alpha$) was calculated.

(Measurement of separation factor of facilitated transport film 20a on porous support 20b)

Raw material gas G (flow rate: 0.32 L/min) having a $CO_2/N_2$ separation factor of "$N_2:CO_2:H_2O=66:21:13$ (partial pressure ratio)" was supplied to the facilitated transport film 20a under the conditions of a temperature of 130° C. and a total pressure of 2001.3 kPa. In addition, gas having permeated was analyzed through gas chromatograph and the $CO_2/N_2$ separation factor ($\alpha$) was calculated.

The module factor was calculated at the initial stage and after 24 hours according to the following formula using the $CO_2/N_2$ separation factor ($\alpha$) measured in the above-described manner.

Module factor=($\alpha$) of separation module/($\alpha$) of facilitated transport film 20a

The results are listed in Table below.

TABLE 1

|  | High-pressure deformation amount [μm] | Module factor | |
|---|---|---|---|
|  |  | Initial stage | After 24 hours |
| Example 1 | 89 | 0.56 | 0.54 |
| Example 2 | 71 | 0.51 | 0.5 |
| Example 3 | 52 | 0.61 | 0.61 |
| Example 4 | 85 | 0.58 | 0.57 |
| Example 5 | 81 | 0.6 | 0.6 |
| Example 6 | 77 | 0.63 | 0.63 |
| Example 7 | 87 | 0.56 | 0.56 |
| Example 8 | 78 | 0.61 | 0.61 |
| Example 9 | 80 | 0.62 | 0.62 |
| Comparative Example 1 | 141 | 0.55 | 0.34 |

Moreover, defect inspection was performed on the facilitated transport film 20a by disassembling the separation modules of Example 1 and Comparative Example 1. As a result, defects of the facilitated transport film 20a were not found in Example 1 while defects of the facilitated transport film 20a were found on the interface of the adhesive layer 30 in Comparative Example 1.

As listed in Table above, in the separation modules of Example 1 to 4 in which a difference in high-pressure deformation amount of the permeating gas channel member 26 between a position at which the adhesive layer 30 is formed and a position other than such a position is 100 μm or less, the module factor does not almost change at the initial stage and after an operation continued for 24 hours.

That is, according to the present invention, it is possible to prevent deterioration or damage to the facilitated transport film 20a caused by a difference d in level by preventing the permeating gas channel member 26 from being greatly compressed even when the raw material gas G is supplied so that the difference d in level is not largely generated on the facilitated transport film 20a. This is also confirmed through disassembling inspection of the separation module of Example 1.

Meanwhile, in the separation module of Comparative Example 1 in which a difference in high-pressure deformation amount between a position at which the adhesive layer 30 is formed and a position other than such a position exceeds 100 μm, the module factor after the operation continued for 24 hours is greatly decreased compared to the initial stage. In other words, in the separation module of Comparative Example 1, it is considered that the permeating gas channel member 26 is greatly compressed by the supply of the raw material gas G or the like, a difference d in level is largely generated on the facilitated transport film 20a, damage is generated in a portion of the facilitated transport film 20a with the difference d in level, and thus separation performance after 24 hours is degraded. This is confirmed when disassembling inspection is performed on the separation module of Comparative Example 1.

From the results described above, the effects of the present invention are obvious.

EXPLANATION OF REFERENCES

10: (acidic gas) separation module
12: central tube
14: laminate
14a: laminate wound product
16: telescoping prevention plate
16a: outer ring portion
16b: inner ring portion
16c: rib
16d: opening portion
18: coating layer
20: acidic gas separation layer
20a: facilitated transport film
20b: porous support
24: supply gas channel member
26: permeating gas channel member
30: adhesive layer
30a: adhesive
34: fixing means
36: pinching body
40: adhesive member

What is claimed is:
1. An acidic-gas separation module comprising:
a central tube in a tube wall of which through-holes are formed;
a supply gas channel member which becomes a channel of raw material gas;
an acidic gas separation layer which separates acidic gas from raw material gas flowing in the supply gas channel member and includes a facilitated transport film that contains a carrier reacting with the acidic gas and a hydrophilic compound for carrying the carrier, and a porous support that supports the facilitated transport film; and
a permeating gas channel member which is a channel in which the acidic gas having permeated through the acidic gas separation layer flows into the central tube, and is provided with a channel regulation member that regulates an acidic gas channel in the inside, and in which a difference in high-pressure deformation amount between a position at which the channel regulation member is formed and a position other than such a position is 100 μm or less,
wherein the high-pressure deformation amount indicates a strain amount in a pressing direction when a pressure of 2 MPa is applied in an environment of a temperature of 80° C. and a relative humidity of 80% RH,
wherein at least one laminate including the supply gas channel member, the acidic gas separation layer, and the permeating gas channel member is wound around the central tube, and
wherein the permeating gas channel member is woven fabric, and each of fibers extending in a same direction in a plane direction of the woven fabric is laminated at a same position in a thickness direction of the woven fabric.

2. The acidic-gas separation module according to claim 1, wherein the permeating gas channel member is formed of any one of ceramic, glass, carbon, polyphenylene sulfide, and modified polypropylene.

3. The acidic-gas separation module according to claim 1, wherein the thickness of the permeating gas channel member is 600 μm or less.

4. The acidic-gas separation module according to claim 1, wherein the laminate includes a pinching body formed by folding the acidic gas separation layer into two and interposing the supply gas channel member between the acidic gas separation layers and has a structure obtained by laminating the permeating gas channel member on the pinching body.

5. The acidic-gas separation module according to claim 1, wherein the channel regulation member is formed to have a rectangular shape in which a side of the central tube is open in the plane direction of the permeating gas channel member.

6. The acidic-gas separation module according to claim 1, wherein the acidic gas is separated from the raw material gas containing moisture under a temperature condition of 50° C. or higher.

7. The acidic-gas separation module according to claim 1, further comprising a hydrophobic intermediate layer having gas permeability between the porous support and the facilitated transport film.

8. The acidic-gas separation module according to claim 7, wherein the intermediate layer is a silicone resin layer.

9. The acidic-gas separation module according to claim 1, wherein the facilitated transport film contains at least one metal element selected from a group consisting of Ti, Zr, Al, Si, and Zn.

10. The acidic-gas separation module according to claim 9, wherein the content of the metal element in the facilitated transport film is in a range of 0.1% by mass to 50% by mass with respect to the total mass of the hydrophilic compound.

11. The acidic-gas separation module according to claim 9, wherein the facilitated transport film contains a structural unit represented by Formula (1):

$$M\text{-}(O\text{---}*)_m \qquad \text{Formula (1)}$$

M represents a metal element selected from the group consisting of Ti, Zr, Al, Si, and Zn, m represents the valence of the metal element represented by M, and the symbol "*" represents a binding site.

* * * * *